United States Patent
Kobayashi et al.

(10) Patent No.: US 7,725,940 B2
(45) Date of Patent: May 25, 2010

(54) OPERATION MANAGEMENT SYSTEM FOR A DISKLESS COMPUTER

(75) Inventors: Ikuko Kobayashi, Kawasaki (JP); Shinji Kimura, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1165 days.

(21) Appl. No.: 11/332,198

(22) Filed: Jan. 17, 2006

(65) Prior Publication Data

US 2007/0074290 A1   Mar. 29, 2007

(30) Foreign Application Priority Data

Sep. 29, 2005   (JP) ............................. 2005-284028

(51) Int. Cl.
*G06F 11/00*   (2006.01)

(52) U.S. Cl. .................... 726/24; 726/22; 707/204

(58) Field of Classification Search ............... 707/204
See application file for complete search history.

(56) References Cited

U.S. PATENT DOCUMENTS

| | | | |
|---|---|---|---|
| 5,802,277 A * | 9/1998 | Cowland | 726/22 |
| 5,948,104 A * | 9/1999 | Gluck et al. | 726/24 |
| 6,289,426 B1 * | 9/2001 | Maffezzoni et al. | 711/173 |
| 6,611,850 B1 | 8/2003 | Shen | |
| 6,751,658 B1 | 6/2004 | Haun | |
| 2004/0010732 A1 | 1/2004 | Oka | |
| 2004/0034671 A1 | 2/2004 | Kodama | |
| 2005/0064859 A1 | 3/2005 | Kotzin | |

FOREIGN PATENT DOCUMENTS

JP   2004-046460   2/2004

* cited by examiner

*Primary Examiner*—Ponnoreay Pich
(74) *Attorney, Agent, or Firm*—Brundidge & Stanger, P.C.

(57) ABSTRACT

The system management server 10 makes a request to the virus detection and removal server 30 for virus detection processing on a specified primary volume of the storage system 20. The virus detection and removal server 30 executes virus detection processing on the requested primary volume and the secondary volume that forms the volume pair at the storage system 20. Even during virus detection processing on the storage system 20, it is possible for the centric PCs 40 and 42 to continue write and read processing on the requested primary volume.

11 Claims, 16 Drawing Sheets

| Logical disk identifier | Type | Connection port information | Logical disk identification information |
|---|---|---|---|
| LU11 | A | n/a | n/a |
| LU12 | B | XX | LU21 |

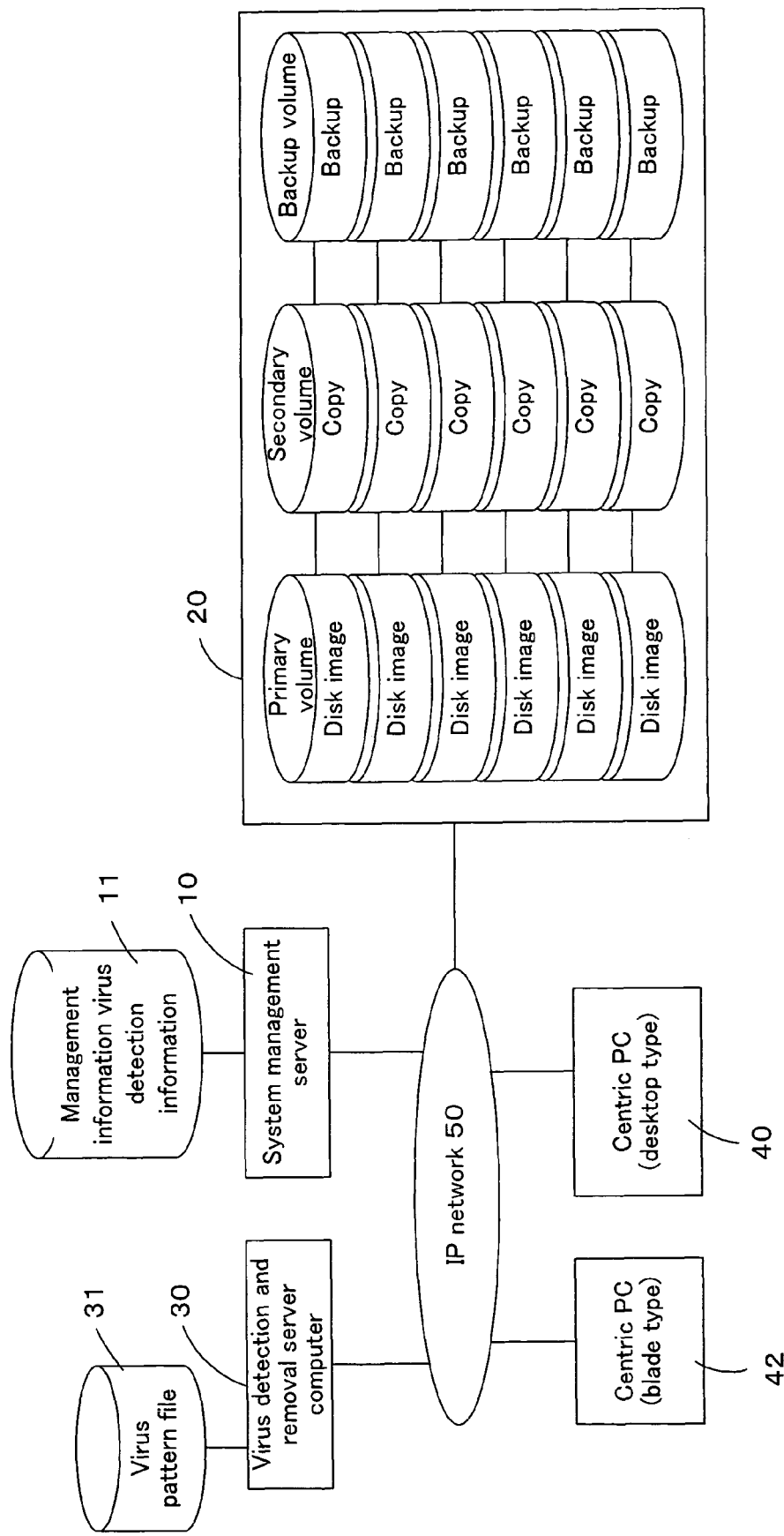

OPERATION MANAGEMENT SYSTEM FOR A DISKLESS COMPUTER

This application claims the benefit of priority of Japanese Patent Application No. 2005-284028 filed on Sep. 29, 2005, the disclosure of which is also entirely incorporated herein by reference.

BACKGROUND

The invention relates to an operation management system for a diskless computer, and more specifically relates to a back end disk service for a computer system having storage.

In the past, an operating system (OS) and various application programs were stored in individual computer storage devices, mainly hard disk drives (HDD), and were executed on individual computers. In relation to this, in recent years, proposed has been a system that uses a so-called diskless computer and storage system with which the OS and various application programs are gathered into a storage system, with the HDD removed from the individual computers.

However, for a computer system with a storage system as its core (hereinafter called the "storage centric system"), to execute virus removal using a diskless computer, the diskless computer must be connected to a network, and during a virus infection, there is the problem that the diskless computer cannot be separated from the network.

In relation to this, with a computer system with a storage centric system, the disk management processes of the virus detection process and the data backup process that had to be executed on each computer in the past can be realized collectively in the storage system.

Meanwhile, at the front end, when the diskless computer is booted up and the diskless computer is using a storage system, there is a problem that the virus detection processing cannot be executed at the back end. Specifically, there was the problem that processing at the front end and processing at the back end had to be executed exclusively.

SUMMARY

The invention was created to address at least part of the problems noted above, and its purpose is to reduce the load of virus detection and virus removal processing on computing systems that have a storage system as a core and to increase the execution efficiency of virus detection and virus removal processing.

The first aspect in accordance with the invention to address the problems noted above provides a computer system having storage. The computer system in accordance with the first aspect has a client computer, a storage system that includes a primary volume that stores data used for booting the client computer and a secondary volume that stores copy data of the data stored in the primary volume, a management computer that, to copy the data stored in the primary volume to the secondary volume at a specified timing, makes a request to the storage system to synchronize the primary volume and the secondary volume, and makes a request to cancel the synchronization after the copying has ended, and a virus detection computer that executes virus detection processing on the secondary volume for which the synchronization has been cancelled.

According to the computer system in accordance with the first aspect of the invention, to copy the data stored in the primary volume to the secondary volume at a specified timing, the primary volume and the secondary volume are synchronized, the synchronization is cancelled after copying has ended, and the virus detection process is executed on the secondary volume for which the synchronization has been cancelled, so it is possible to reduce the load of virus detection and virus removal processing on the computer system having a storage centric system, and to attempt to improve execution efficiency of the virus detection and virus removal processing.

The second aspect of the invention provides a storage system with which a management computer, a virus detection computer, and a client computer are connected. The storage system in accordance with the second aspect of the invention comprises:

a storage device having a primary volume that is correlated to the client computer and that stores data used to boot the client computer, and a secondary volume that is correlated to the primary volume, that is a secondary volume used for backing up the data stored in the primary volume at a specified timing, and that is subject to the virus detection process of the virus detection computer, a first I/O module that provides a path for the primary volume to the client computer, a second I/O module that provides a path for the primary volume and the secondary volume to the virus detection computer, a third I/O module that receives instructions from the management computer, and a control module that implements synchronization or separation of the primary volume and the secondary volume according to instructions from the management computer, the control module synchronizing the primary volume and the secondary volume and executing data synchronization of both volumes before virus detection processing using the virus detection computer, and canceling synchronization of the primary volume and the secondary volume during the virus detection processing by the virus detection computer.

According to the storage system in accordance with the second aspect of the invention, provided are a first I/O module that provides a path for the primary volume to the client computer, a second I/O module that provides a path for the primary volume and the secondary volume to the virus detection computer, a third I/O module that receives instructions from the management computer, and a control module that does synchronization or separation of the primary volume and the secondary volume according to instructions from the management computer, the control module synchronizing the primary volume and the secondary volume and executing data synchronization of both volumes before virus detection processing using the virus detection computer, and canceling synchronization of the primary volume and the secondary volume during the virus detection processing by the virus detection computer, so it is possible to reduce the load for virus detection and virus removal processing with a computer system with a storage centric system, and to improve the execution efficiency of the virus detection and virus removal processing.

The third aspect of the invention provides a management computer that manages a client computer, a storage system, and a virus detection computer. The management computer in accordance with the third aspect of the invention is equipped with a client computer management module that manages booting and shutdown of the client computer, and at a specified timing, when the client computer is shut down, prohibits booting of the client computer, a storage system management module that gives instructions for synchronization and synchronization cancellation of the primary volume and the secondary volume to the storage system that has a primary volume that stores data used for booting the client computer and a secondary volume that stores copy data of the primary volume, the storage system management module making a request to synchronize the primary volume and the secondary volume when booting of the client computer is prohibited, and after the synchronization of both volumes is completed, makes a request for synchronization cancellation of the primary volume and the secondary volume, and a virus detection computer management module that makes a request to the virus detection computer to do virus detection processing on the secondary volume for which synchronization was cancelled.

According to the management computer in accordance with the third aspect of the invention, when the client computer is shut down at a specified timing, booting of the client computer is prohibited, and when booting of the client computer is prohibited, a request is made for synchronization of the primary volume and the secondary volume, and after synchronization of both volumes is completed, a request is made to cancel synchronization of the primary volume and the secondary volume, and a request is made to the virus detection computer to do virus detection processing on the secondary volume for which synchronization has been cancelled, so it is possible to reduce the load of virus detection and virus detection processing on a computer system that has a storage centric system, and to attempt to increase the execution efficiency of the virus detection and virus removal processing.

The computer system, the management computer, and the storage system in accordance with the invention may also be realized as a virus detection processing method, a virus removal method, a virus detection program, a virus removal program, a virus detection processing program or a computer readable recording medium on which is recorded a virus detection program.

BRIEF DESCRIPTION OF THE DRAWINGS

FIG. 18 is an explanatory drawing showing another schematic structure of the computer system that has a storage centric system in accordance with the embodiment.

DETAILED DESCRIPTION OF THE PREFERRED EMBODIMENTS

Figure 1:
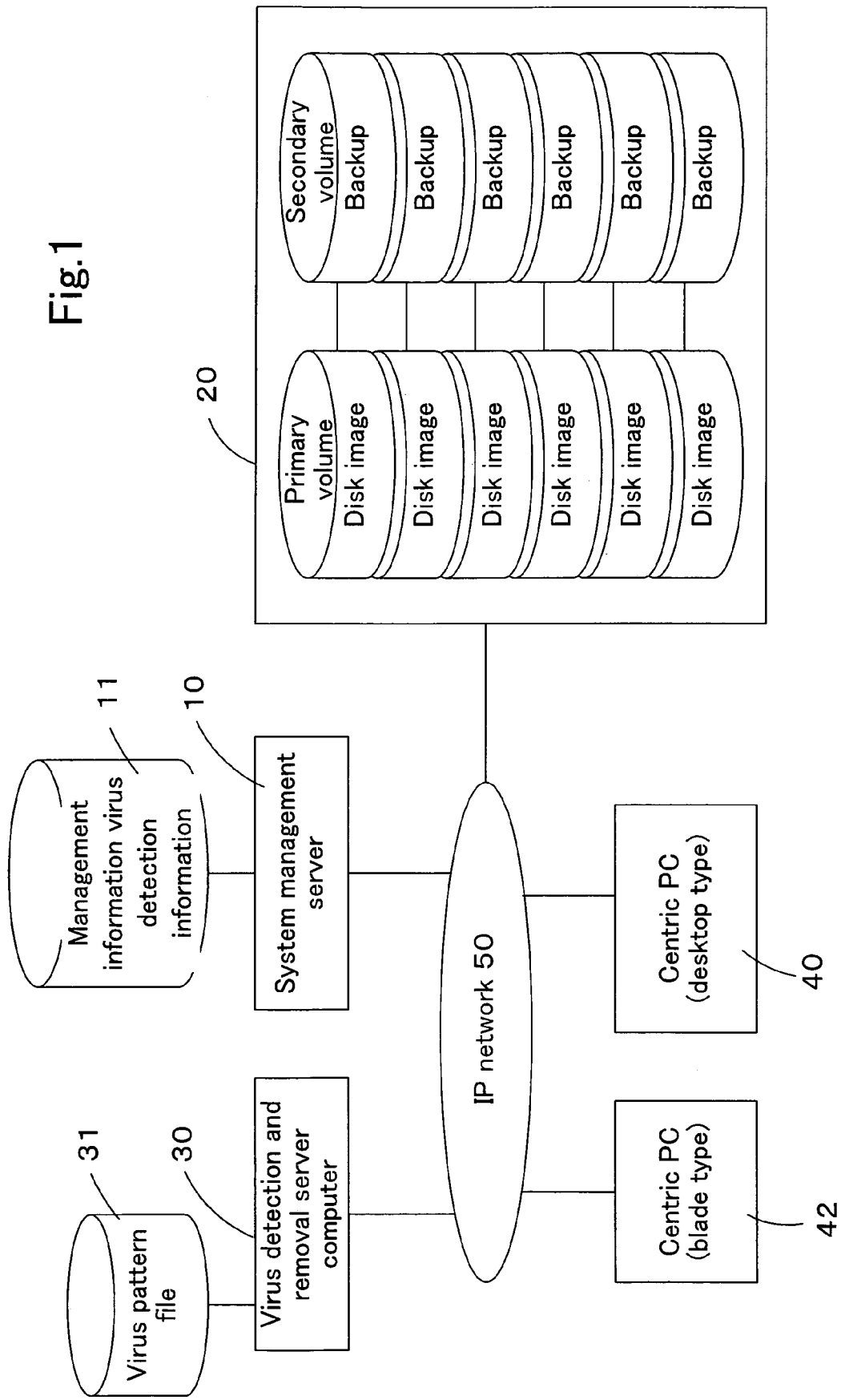
FIG. 1 is an explanatory drawing showing the schematic structure of a computer system with a storage centric system in accordance with the embodiment.

Following, a computer system (operation management system for a diskless computer) with a storage centric system in accordance with the invention is described based on embodiments while referring to the drawings.

Figure 2:
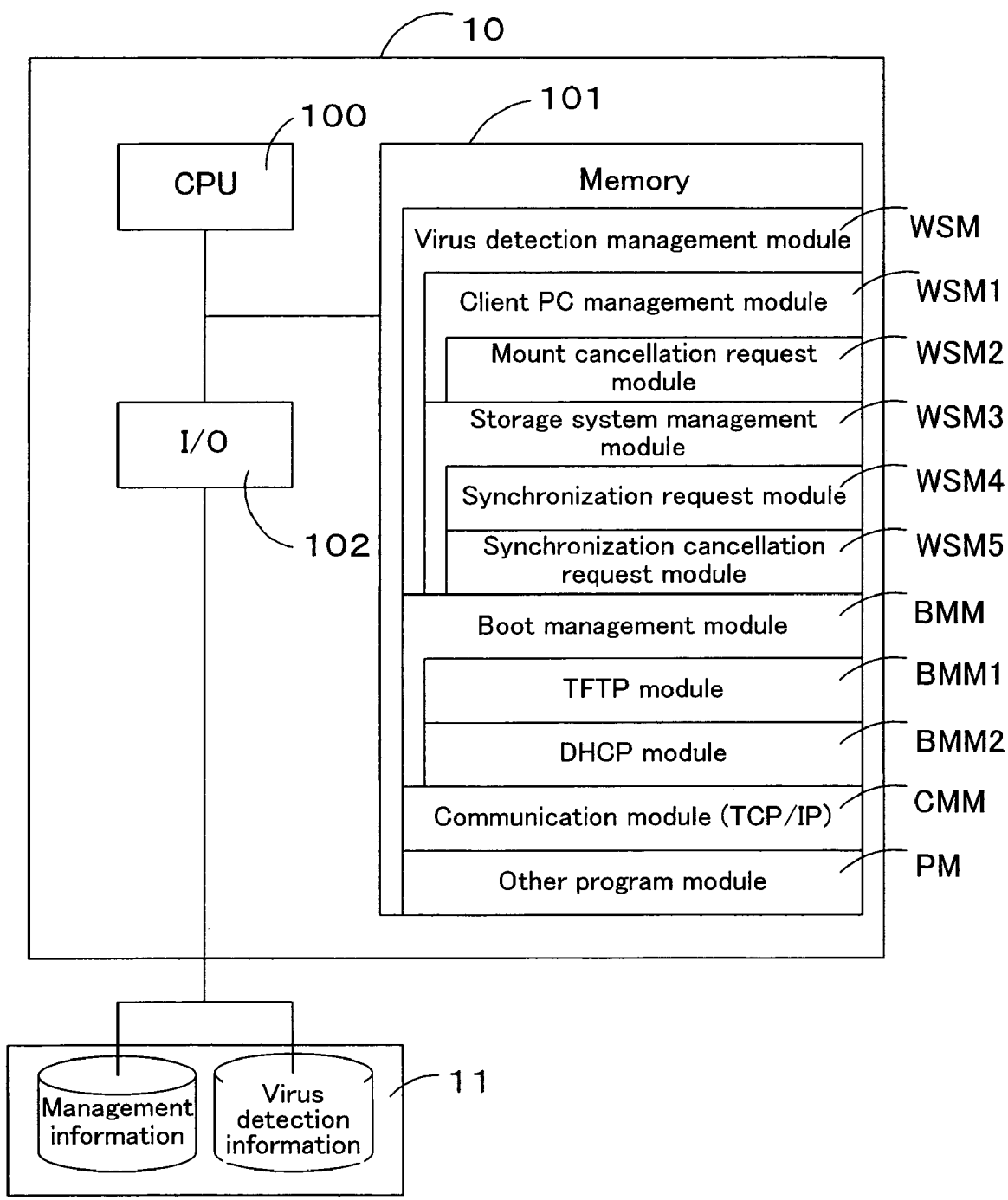
FIG. 2 is an explanatory drawing that conceptually shows the internal structure of the management computer in accordance with the embodiment.
Figure 3:
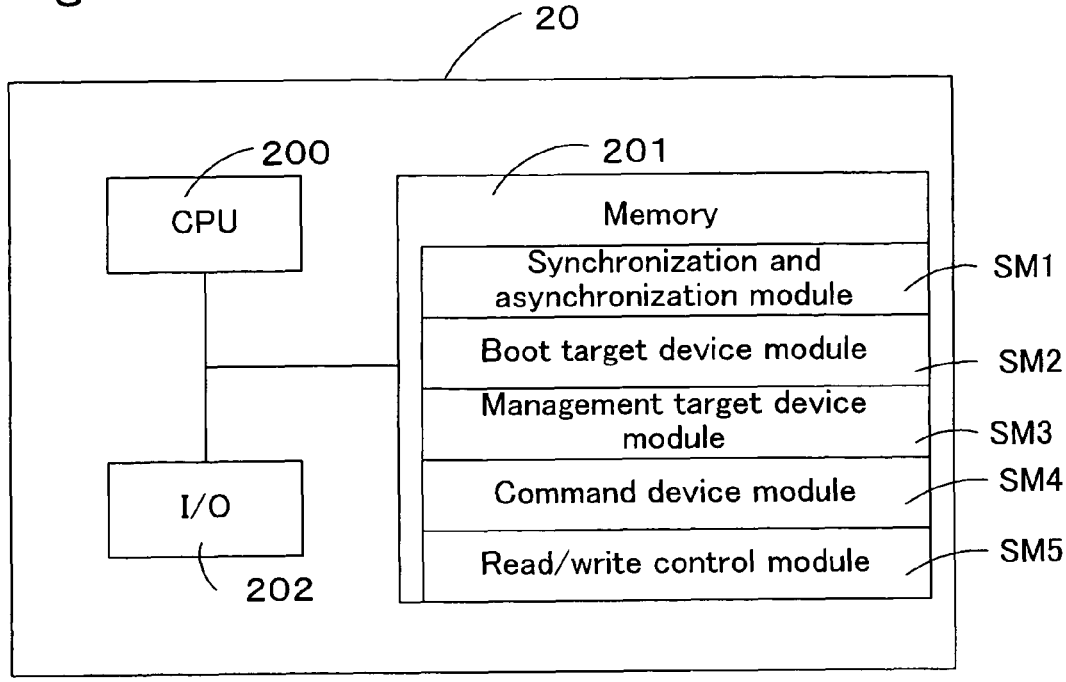
FIG. 3 is an explanatory drawing that conceptually shows the internal structure of the storage system in accordance with the embodiment.
Figure 4:
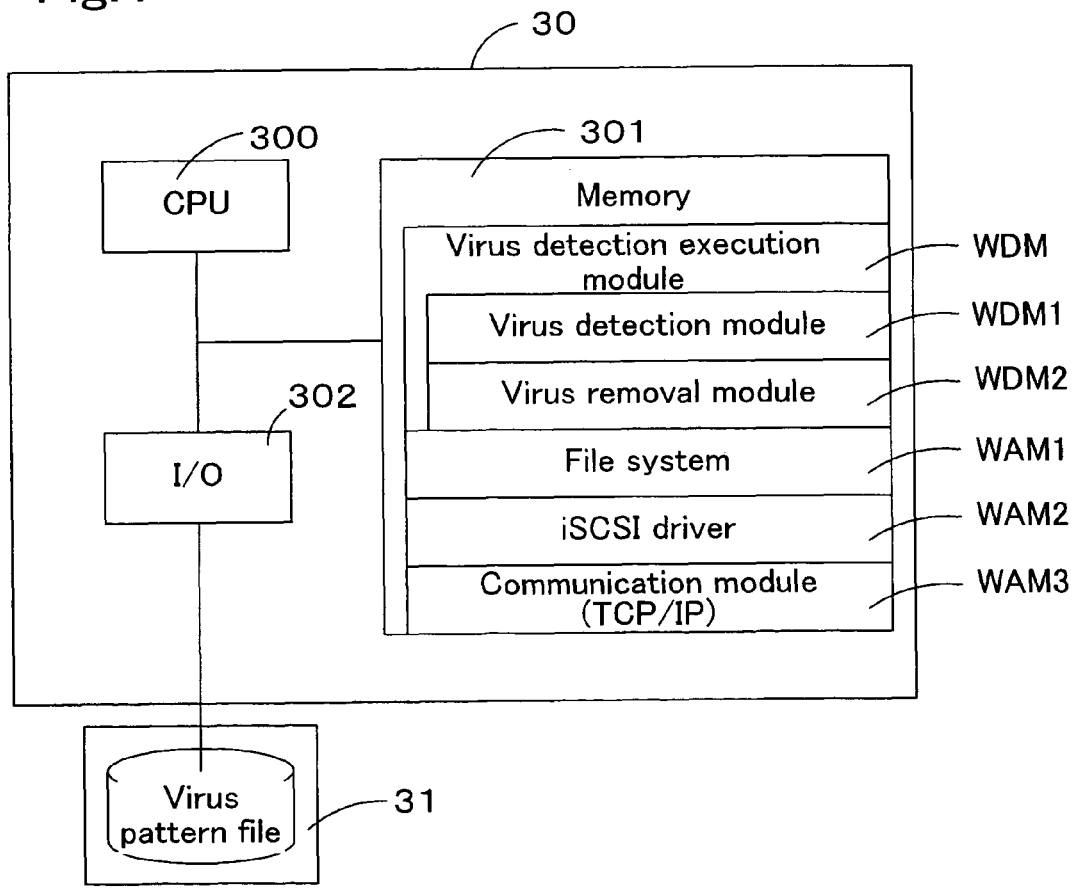
FIG. 4 is an explanatory drawing that conceptually shows the internal structure of the centric PC in accordance with the embodiment.
Figure 5:
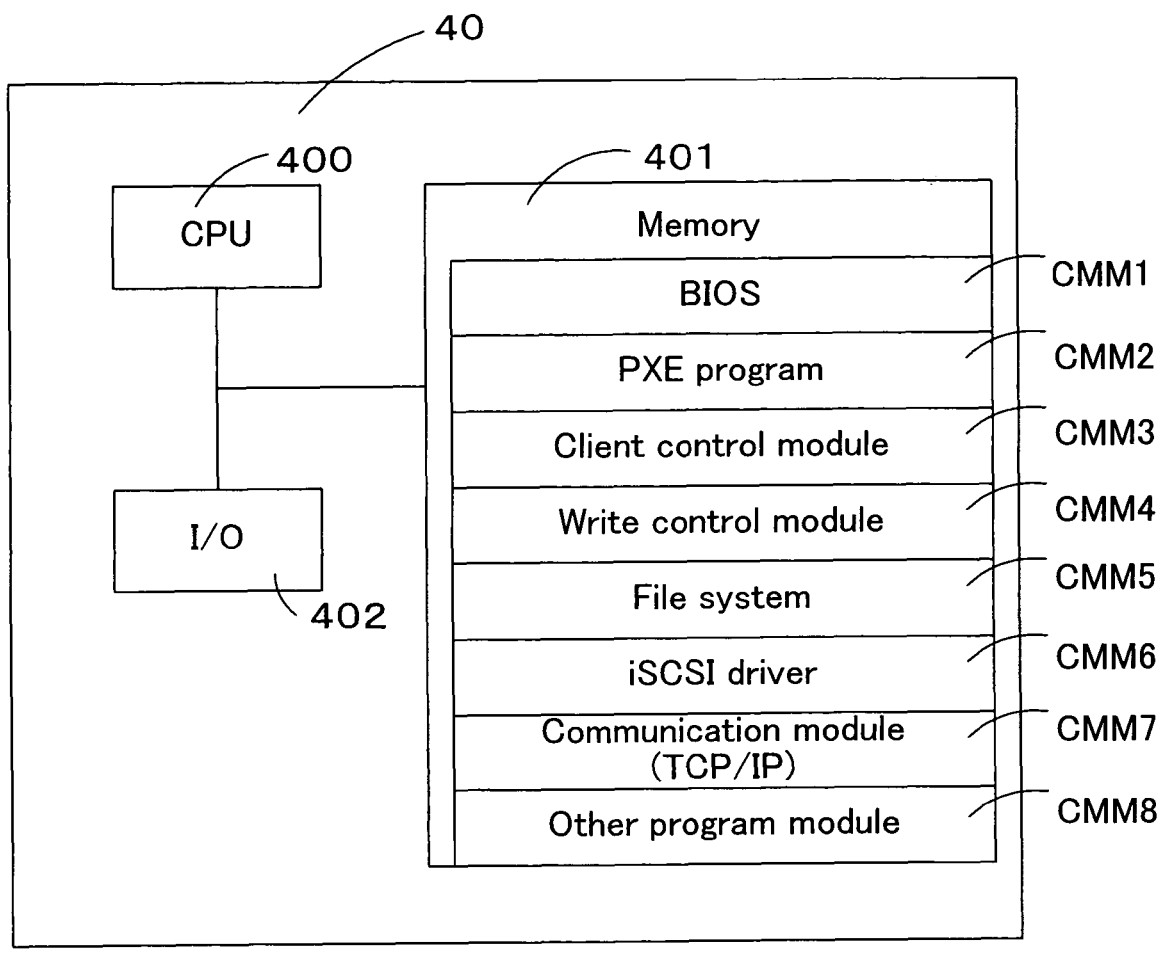
FIG. 5 is an explanatory drawing that conceptually shows the internal structure of the virus detection computer in accordance with the embodiment.

System Configuration:

The schematic structure of a computer system with a storage centric system (storage centric system) in accordance with this embodiment is described while referring to FIG. 1 through FIG. 5. FIG. 1 is an explanatory drawing showing the schematic structure of a computer system with a storage centric system in accordance with this embodiment. FIG. 2 is an explanatory drawing that conceptually shows the internal structure of the management computer in accordance with this embodiment. FIG. 3 is an explanatory drawing that conceptually shows the internal structure of the storage system in accordance with this embodiment. FIG. 4 is an explanatory drawing that conceptually shows the internal structure of the centric PC in accordance with this embodiment. FIG. 5 is an explanatory drawing that conceptually shows the internal structure of the virus detection computer in accordance with this embodiment.

The storage centric system in accordance with this embodiment is equipped with a system management server computer 10 (hereafter called the "system management server"), a storage system 20 having a primary volume and a secondary volume, a virus detection and removal server computer 30 (hereafter called the "virus detection and removal server") as the virus detection computer, and centric PCs 40 and 42 as the client computers. Each of the computers and the storage system 20 are connected via an IP network 50. The IP network 50 is a local area network (LAN) constituted by the Ethernet, and transmission of data is executed using TCP, UDP, and IP protocols as the communication protocol. With this embodiment, SCSI commands are used for the communication between the system management server 10, the virus detection and removal server 30, the centric PCs 40 and 42, and the storage system 20, and data is sent and received using block data units. Also, SCSI commands and responses are sent and received via the IP network 50, so the iSCSI protocol with which SCSI commands and responses are encapsulated into TCP packets is used.

The system management server 10 is a server computer that manages the user that uses the storage centric system, the centric PCs 40 and 42 that are the PCs used by the user, and the storage system 20 that stores the disk image. The system management server 10 is connected to the storage device 11 that stores the various management information described later.

As shown in FIG. 2, the system management server 10 has internally a CPU 100, a memory 101, and an I/O interface 102. The CPU 100, the memory 101, and the I/O interface 102 are mutually connected via a bus. The CPU 100 is a central processing unit that executes the various programs and modules stored in the memory 101. The memory 101 is a so-called internal storage unit, and includes both non-volatile memory that stores the various modules and the like and volatile memory that temporarily stores the arithmetic processing results. The I/O interface 102 is connected to the storage system 20 and the centric PCs 40 and 42 via the IP network 50.

The memory 101 stores the virus detection management module WSM for executing virus detection and removal processing on the storage system 20 at the back end, a boot management module BMM that executes boot processing on the centric PCs 40 and 42, a communication module CMM for executing communication via the IP network 50, and other programs and modules PM.

The virus detection management module WSM has a centric PC management module WSM1 for managing the PC status which is the operation status of the centric PCs 40 and 42, and a storage system management module WSM3 for managing the operating status of the storage system 20. The client PC management module WSM1 further has a mount cancellation request module WSM2 that makes a request to the centric PCs 40 and 42 for cancellation of mounting for the primary volume. The storage system management module WSM3 further has a synchronization request module WSM4 that makes a request for the synchronization of the primary volume and the secondary volume to the storage system 20, and a synchronization cancellation request module WSM5 that makes a request for cancellation of synchronization of the primary volume and the secondary volume.

The boot management module BMM is equipped with a TFTP module BMM1 and a DHCP module BMM2 necessary for network booting by the centric PCs 40 and 42. The TFTP module BMM1 realizes the TFTP server function of providing boot strap programs to the centric PCs 40 and 42 according to requests of PXE programs executed by the BIOS during booting of the centric PCs 40 and 42. The DHCP module BMM2 realizes the DHCP server function of providing the booting information necessary for network booting by the centric PCs 40 and 42 such as the IP address to be used, the system management server 10 IP address, the boot loader program name, and the DHCP options, for example, to the centric PCs 40 and 42 according to requests of the PXE program executed by BIOS during booting of the centric PCs 40 and 42.

The communication module CMM is a module for converting the sent data to TCP/IP packets compliant with TCP/IP protocol, or for converting received TCP/IP packets to data in order to execute communication through the IP network 50, and the TCP/IP connection is established according to a request for connection establishment from the centric PCs 40 and 42. Also, the communication module CMM makes a request for establishment of a connection to the storage system 20, waits for a response from the storage system 20, and establishes a TCP/IP connection.

Connected to the system management server 10 is an external storage device 11 that stores various types of management information described later and information relating to virus detection processing. Note that the storage device 11 may also be equipped inside the system management server 10. It is also possible to store the various types of management information and the information relating to virus detection processing in the memory 101.

The storage system 20 is a disk array device with a RAID structured by a plurality of magnetic hard disk drives, providing a logical volume that is one or a plurality of logical volumes with a plurality of hard disk drives, or provides one or a plurality of logical volumes with one hard disk drive. Each logical volume is called a logical unit, and access to each logical volume is executed using a logical unit number (LUN) and a logical block address (LBA). Note that with this embodiment, as shown in FIG. 1, equipped are a primary volume of logical volumes that store the disk images for booting of the centric PCs 40 and 41, and a secondary volume of logical volumes that store the backup data of the primary volume, and the primary volume and the secondary volume are constituted in mutually different hard disk drives. Also, the primary volume and the secondary volume that form a pair are called a volume pair, and storage system 20 has a plurality of volume pairs as shown in FIG. 1.

As shown in FIG. 3, the storage system 20 internally contains a CPU 200, a memory 201, and an I/O interface 202. The CPU 200, the memory 201, and the I/O interface 202 are mutually connected via a bus. The CPU 200 is a central processing device that executes various types of programs and modules stored in the memory 201. The memory 201 is a so-called internal storage unit, and includes non-volatile memory that stores various modules and the like, and volatile memory that temporarily stores the arithmetic processing results. The I/O interface 202 connects the system management server 10, the virus detection and removal server 30, and the centric PCs 40 and 42 via the IP network 50. The control circuit that is equipped with the CPU 200, the memory 201, and the I/O interface 202 is generally called a channel adapter, and controls reading, writing, and synchronization and asynchronization processing for the storage system 20.

Stored in the memory 201 are a synchronization and asynchronization module SM1 for executing synchronization and asynchronization (separation) of the primary volume and the secondary volume, a boot target device module SM2 that provides an access path to the primary volume for the centric PCs 40 and 42, a management target device module SM3 that provides an access path to the primary volume and the secondary volume for the virus detection and removal server 30, and a command device module SM4 for providing a path for sending write and read commands correlating to the synchronization request commands and separation request commands to the system management server 10, and a read/write control module SM5 that controls reading and writing for the primary volume and the secondary volume.

The synchronization and asynchronization module SM1 mounts the primary volume on the secondary volume path to copy the disk image data stored in the primary volume to the secondary volume and synchronizes the primary volume data to the secondary volume data according to a request from the system management server 10. The synchronization and asynchronization module SM1 asynchronizes (separates) the primary volume and the secondary volume by unmounting the primary volume from the secondary volume. When the primary volume and the secondary volume are synchronized, the secondary volume path is mounted in the primary volume, so writing by other devices is not allowed. Here, mounting means the volume being in a usable state by the computer, meaning, for example, that the operating system allocates a file name to a volume, and incorporates the volume for which a file name is allocated to the directory tree managed by the operation system. Not that the synchronization and asynchronization module SM1 also executes the reverse synchronization process that copies the secondary volume data to the primary volume according to requests from the system management server 10.

The boot target device module SM2 provides a virtual boot iSCSI target device (I/O unit) that is the target to the centric PCs 40 and 42 that are the initiators. The boot iSCSI target device is clearly identified by the target name and the IP address, and is correlated to a primary volume of any of the plurality of primary volumes that the storage system 20 has. Therefore, each centric PC 40 and 42 is able to access the primary volume in which the corresponding disk image is stored via the boot iSCSI target device when the primary volume is mounted on the corresponding boot iSCSI target device. Specifically, by mounting the primary volume, the centric PCs 40 and 42 are able to use the data stored in the primary volume.

The boot target device module SM2 fetches SCSI commands and data from the iSCSI packet received from the centric PCs 40 and 42, or changes the response and data in relation to the centric PCs 40 and 42 to iSCSI packets.

The management target device module SM3 provides a virtual management iSCSI target device (I/O unit) that is the target to the virus detection and removal server 30 that is the initiator. The management iSCSI target device is clearly identified by the target name and the IP address, and is correlated to a primary volume pair of any of the plurality of pairs of primary volumes and secondary volumes (volume pairs) that the storage system 20 has. Therefore, the virus detection and removal server 30 is able to access the primary volume or secondary volume via the management iSCSI target device when the corresponding primary volume or secondary volume is mounted on the management iSCSI target device.

The management target device module SM3 fetches the SCSI commands and data from the iSCSI packet received from the virus detection and removal server 30, or turns the responses and data for the virus detection and removal server 30 into iSCSI packets.

The command device module SM4 provides a virtual command device for the system management server 10 to send general purpose write and read commands correlating to the synchronization request commands and separation request commands. When the command send device and the command receive device do not have shared commands other than the general purpose write and read commands, the command device converts processes inherent to the command receive device to request commands using the general purpose write and read commands. Specifically, the command device provided by the command device module SM4 with this embodiment is a command device for handling synchronization and separation request of the primary volume and secondary volume, and the write and read commands to the specified primary volume for this command device are converted to synchronization request commands and separation request commands of specified primary volumes and secondary volumes (interpreted as synchronization and separation request commands). The command device module SM4, when it receives converted synchronization and separation request commands of the primary volumes and secondary volumes, makes a request for execution of synchronization or asynchronization of the primary volume and secondary volume constituting a volume pair to the synchronization and asynchronization module SM1.

The read and write control module SM5 controls reading and writing for the primary volume and the secondary volume. For example, when synchronization of the primary volume and secondary volume data is requested, after the primary volume is mounted in the secondary volume, all the data stored in the primary volume is read and all the read data is written to the secondary volume. Or, after synchronization of the data executed immediately before, the differential data correlating to the difference of the data of the primary volume and the secondary volume is written to the secondary volume. The data written to each address takes only a value of either logic 0 or logic 1, so it is possible to obtain the differential data by identifying the address of the changed data. Therefore, the differential data is an address map for identifying changed data, for example.

As shown in FIG. 4, the virus detection and removal server 30 internally contains a CPU 300, a memory 301, and an I/O interface 302. The CPU 300, the memory 301, and the I/O interface 302 are mutually connected via a bus. The CPU 300 is a central processing unit that executes various programs and modules including virus detection modules and virus removal modules stored in the memory 301. The memory 301 is a so-called internal storage unit, and includes both non-volatile memory that stores various modules and the like, and volatile memory that temporarily stores the arithmetic processing results. The I/O interface 302 connects the system management server 10 and the storage system 20 via the IP network 50. Connected to the virus detection and removal server 30 is an external storage unit 31 that stores the virus pattern file (virus definition file). Included in the virus pattern file stored in the storage device 31 are a virus pattern file used for the virus detection and removal server 30 for executing virus detection processing periodically, and a real time virus pattern file used for the real time virus detection process with the centric PCs 40 and 42. Note that the storage device 31 may also have the virus detection and removal server 30 equipped internally.

Stored in the memory 301 are a virus detection execution module WDM that executes virus detection and removal, a file system WAM1, an iSCSI driver WAM2, and a communication module WAM3.

The virus detection execution module WDM updates the two types of virus pattern file stored in the storage device 31 according to a request from the system management server 10 or according to notification from the virus pattern file supply source. Specifically, the virus pattern files used for real time virus detection processing at centric PCs 40 and 42 are also updated by the virus detection execution module WDM. When the real time virus pattern file is updated, the virus detection execution module WDM writes the updated real time virus pattern file to the primary volume correlated to each of the centric PCs 40 and 42 via the management iSCSI target device.

The virus detection execution module WDM has a virus detection module WDM1 that executes virus detection processing on the secondary volume, and a virus removal module WDM2 that executes virus removal processing on the primary volume or the secondary volume when a virus is found on the secondary volume. The virus detection processing for the secondary volume is executed by detecting a file that matches the virus pattern defined in the virus pattern file from the secondary volume, for example. The virus detection module WEM1 determines that the secondary volume is infected with a virus when a file that matches the virus pattern defined in the virus pattern file (virus infected file) exists in the secondary volume.

The virus removal module WDM2 executes virus removal processing on the primary volume when a virus removal request is received from the system management server 10 after a virus infected file is found by the virus detection module WDM1. The virus removal module WDM2 executes virus removal processing on the primary volume by deleting and isolating the found virus infection.

The file system WAM1 is a data management module that performs logical address and physical address conversion to handle the block data stored in the storage system 20 as file data. With this embodiment, the storage system is not equipped with a file system, and sending and receiving of data is done in block units between each computer and the storage system 20. Meanwhile, the operating system and applications executed on each computer generally handle data using file units. In light of this, the virus detection and removal server 30 which is one computer related to the storage system 20 is equipped with a file system.

The iSCSI driver WAM2 fetches the SCSI responses and data from the iSCSI data received from the storage system 20, or changes the SCSI commands and data for the storage system 20 to iSCSI data.

The communication module WAM3 is a module for converting iSCSI data to TCP/IP packets compliant with TCP/IP protocol or that converts received TCP/IP packets to iSCSI data in order to execute communication through the IP network 50, and makes a request for establishing a connection to the storage system 20 (management iSCSI target device), waits for a response from the storage system 20, and establishes a TCP/IP connection.

The centric PC may be either the desktop type centric PC 40 or the blade type centric PC 42. Both of the centric PCs 40 and 42 are diskless computers that do not internally contain a storage device such as a hard disk drive, for example. However, the desktop type centric PC 40 may also be a typical computer that does internally contain a hard disk drive. When the desktop type centric PC 40 does contain a hard disk drive, after the hard disk drive recording contents are moved to the storage system 20, when operating the centric PC 40, the hard disk drive is not used, and this is used in the same way as a diskless computer. Specifically, the centric PC 40 used with this embodiment is a computer that uses the storage system 20 via a network as the boot disk device, and includes not only diskless computers, but also computers that do not require a local boot disk device during computer operation.

The blade type centric PC 42 is a centric PC equipped with a remote desktop server function. Specifically, the blade type centric PC 42 is a computer that is not equipped with an input device such as a keyboard, for example, or an output device such as a display, for example, but is equipped only with an arithmetic processing function unit that that executes request processing input from the input device of a terminal PC, and outputs the execution results (display screen) to the display device of a terminal PC.

The centric PC 40 is described in detail using an example. As shown in FIG. 5, the centric PC 40 internally contains a CPU 400, a memory 401, and an I/O interface 402. The CPU 400, the memory 401, and the I/O interface 402 are mutually connected via a bus. The CPU 400 is a central processing unit that executes various programs and modules including the client control module and the write control module stored in the memory 301. The memory 401 is a so-called internal storage unit, and includes both non-volatile memory that stores various modules and the like and volatile memory that temporarily stores the arithmetic processing results. The I/O interface 402 connects the system management server 10 and the storage system 20 via the IP network 50.

Stored in the memory 401 are a BIOS (CMM1) for booting the centric PCs 40 and 42, a PXE (Preboot execution Environment) program CMM2 to make network booting possible, a client control module CMM3 for controlling the operation of the centric PCs 40 and 42 according to requests from the system management server 10, a write control module CMM4 for controlling writing to the primary volume, a file system CMM5 that makes possible access in file units to the storage system 20 that performs logical address and physical address conversion, an iSCSI driver CMM6, a communication module CMM7, and other programs, modules, and drivers CMM8.

The BIOS (CMM1) is a program that is executed during booting of the computer, and executes the PXE program CMM2 after initialization of each device. The PXE program CMM2 sends the MAC address to the DHCP module BMM2 of the system management server 10, and requests the IP address and DHCP options. The PXE program CMM2 uses the fetched TFTP module BMM1 IP address and makes a request for the boot strap program to the TFTP module BMM1 of the system management server 10. The PXE program CMM2 that received the boot strap program boots the boot strap program, and through an authentication process, boots the operating system stored in the primary volume corresponding to the storage system 20.

The client control module CMM3 executes shutdown of the operating system according to a request or notification from the system management server. Also, the shutdown is notified to the system management server 10.

The write control module CMM4 holds writing to the storage system 20 according to a request from the system management server 10. The write control module CMM4 is realized by a file system that is part of the operating system, and by temporarily storing the write data generated during write hold in cache (not illustrated), completion of the virtual write to the storage system 20 is realized. When the cache capacity has been exceeded or when virus removal processing has been executed on the storage system 20, the write control module CMM4 destroys the write data stored in cache, and performs notification to the effect that writing of the destroyed write data failed. This notification is notified to the user as an error message displayed on a display.

The write control module CMM4 reflects the write data stored in cache in the primary volume before holding write. The write process to the storage system 20 is slower in speed than the CPU 400 processing speed (frequency of occurrence of write requests), so the data for which writing is requested to the storage system 20 is written in sequence to the storage system 20 after being stored once in cache. Therefore, if all the write data stored in cache is not written to the primary volume before execution of write hold, a write error occurs. In light of this, the write control module CMM4 reflects all the write data stored in cache to the primary volume.

Figure 6:
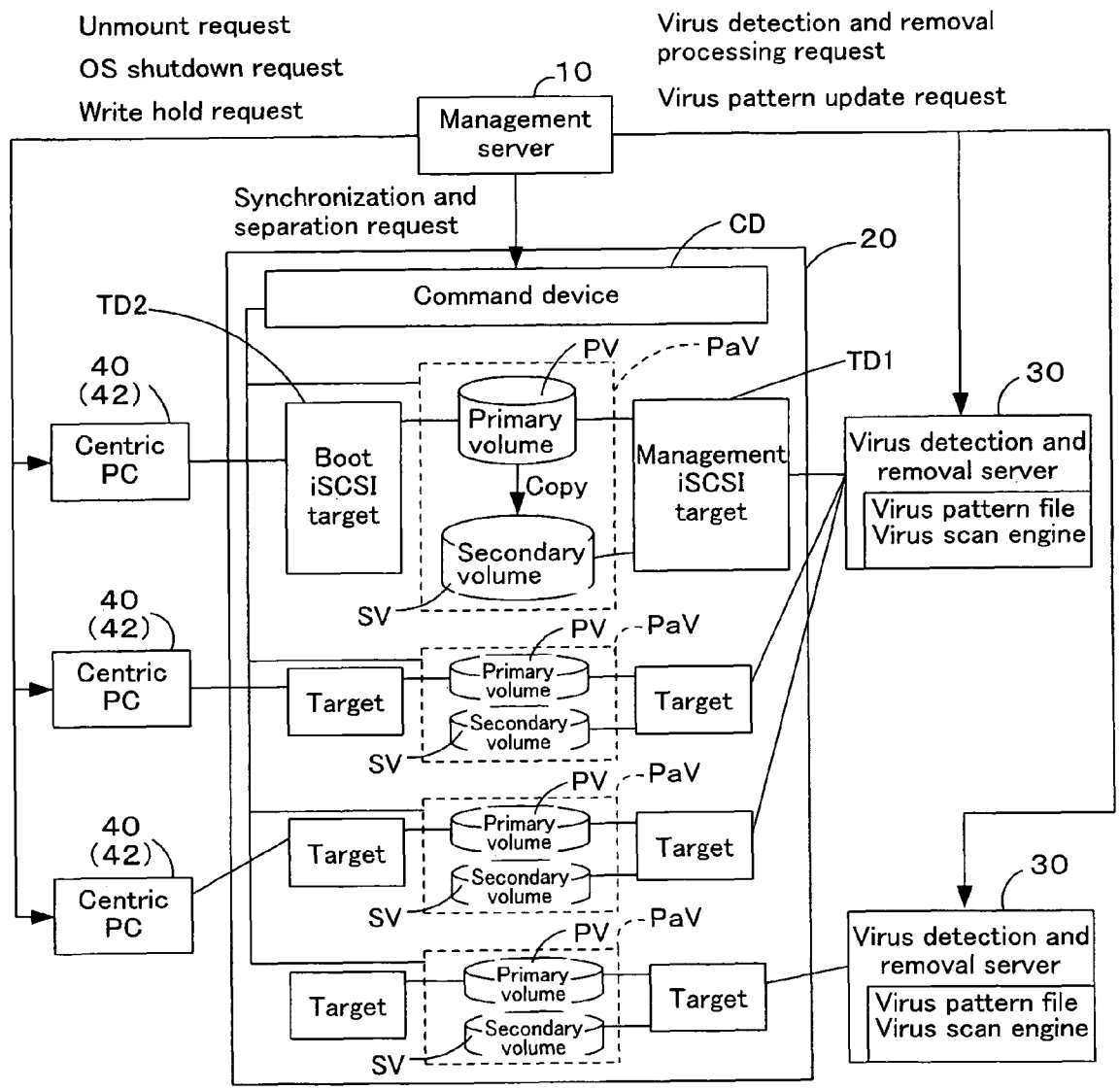
FIG. 6 is a block diagram functionally showing the internal structure of the storage centric system in accordance with the embodiment.

Internal Structure of the Storage System:

The operation of each device for the storage centric system in accordance with this embodiment is described while referring to FIG. 6. FIG. 6 is a block diagram functionally showing the internal structure of the storage centric system in accordance with this embodiment.

The storage system 20 is equipped with a plurality of volume pairs PaV consisting of a pair of primary volume PV and secondary volume SV. It is preferable that the physical disk that realizes the primary volume and the physical disk that realizes the secondary volume SV for each volume pair PaV be different. However, when a further backup volume is prepared for the secondary volume SV, it is also possible to construct the primary volume PV and the secondary volume SV on the same physical disk. As was already described, disk image data of the corresponding centric PCs 40 and 42 is stored in the primary volume PV, and copy data (backup data) of the primary volume PV that forms the pair is stored in the secondary volume SV. The storage system 20 is equipped with a command device CD that is the command sending destination path from the system management server 10, a management iSCSI target device TD1 that provides a path that can be accessed by the virus detection and removal server 30, and a boot iSCSI target device TD2 that provides a path that is accessible by the centric PCs 40 and 42.

As shown in FIG. 6, when the virus detection and removal server 30 executes virus detection processing, through an authentication process, a connection is established with the management iSCSI target device TD1, and after mounting of the secondary volume SV, virus detection processing is executed on the secondary volume SV. Meanwhile, when virus removal processing is executed, the virus detection and removal server 30, through an authentication process, establishes a connection with the management iSCSI target device TD1, and after mounting of the primary volume PV, virus removal processing is executed on the primary volume PV. The virus detection and removal server 30 executes virus detection processing and virus removal processing on the plurality of volume pairs, so there is a valid login ID for the plurality of management iSCSI target devices TD1. Note that it is possible for a plurality of virus detection and removal servers 30 to be used according to the number of volume pairs.

The authentication process includes a login process to the system management server 10, and a login process to the storage system 20 (iSCSI login). Also, for the authentication process, there is an authentication process using an ID and a password, and an authentication process using the Mac address of the login device. Following, the authentication process using an ID and a password is described using an example. With the authentication process for the system management server 10, a typical authentication process using a user ID and a password is executed, and after authentication, directory service is executed. Specifically, the authentication process for the system management server 10 can be called an authentication process for the directory service. With the directory service, provided is the information necessary to log in to the virus detection and removal server 30 and to the storage system 20, for example. With this embodiment, a directory service compliant with LDAP (Lightweight Directory Access Protocol) protocol is used.

With the authentication process for the storage system 20, using the management iSCSI target device TD1 information and the initiator name allocated by the system management server, the authentication process is executed using the user ID and the secret (password) between the allocated management iSCSI target device TD1. For this authentication process, CHAP (Challenge Handshake Authentication Protocol), for example, is used as the authentication protocol.

Each centric PC 40 and 42, through an authentication process, mounts the corresponding primary volume PV via the boot iSCSI target device TD2, and boots the operating system from the boot image disk. After booting of the operating system, according to the execution process of the application programs executed on the operating systems, each centric PC 40 and 42 execute write and read processing to the primary volume PV. Generally, one primary volume PV is allocated for each centric PC 40 and 42, and each centric PC 40 and 42 has a valid login ID for one boot iSCSI target device TD2. The authentication process executed by the centric PCs 40 and 42 is the authentication process for executing network booting. The authentication process includes an authentication process for the system management server 10 and an authentication process for the storage system 20.

With the authentication process for the system management server 10, typical authentication processing is executed using a user ID and a password, and after authentication, director service is executed. With directory service, for example, the information necessary to log in to the storage system is provided to the centric PCs 40 and 42. With this embodiment, a directory service compliant with the LDAP (Lightweight Directory Access Protocol) protocol is used.

With the authentication process for the storage system 20, using the boot iSCSI target device TD2 information and the initiator name allocated by the system management server are used, and the authentication process is executed using the user ID and the secret (password) between the allocated boot iSCSI target device TD2. For this authentication process, for example, CHAP (Challenge Handshake Authentication Protocol) is used as the authentication protocol. Note that when a blade type centric PC 42, during boot strapping, the user ID/secret used during login to the storage system 30 is notified to the centric PC 42, and authentication processing using the notified user ID/secret is executed. When a desktop type centric PC 40, the user inputs the user ID/secret via the input device, but when a blade type centric PC 42, because a login process or the like is gone through for the storage centric system, user ID/secret input by the user is not possible.

To control synchronization and separation of the primary volume PV and the secondary volume SV that constitute a volume pair, the system management server 10 establishes a connection with the command device CD that converts general purpose read and write commands to commands that request synchronization and separation. When write commands or read commands are input from the system management server 10 to the command device CD, the command device CD converts this to synchronization and separation commands, and sends these to the synchronization and asynchronization module SM1. The synchronization and asynchronization module SM1 executes synchronization or separation of the primary volume PV and the secondary volume SV using volume pair units according to the received commands.

Virus detection process, virus removal process, and virus pattern file update requests are sent to the virus detection and removal server 30 from the system management server 10 via the IP network 50. Mount cancellation (unmount) requests for the primary volume PV, operating system shutdown requests, and write hold requests are sent to the centric PCs 40 and 42 from the system management server 10 via the IP network 50.

Figure 7:
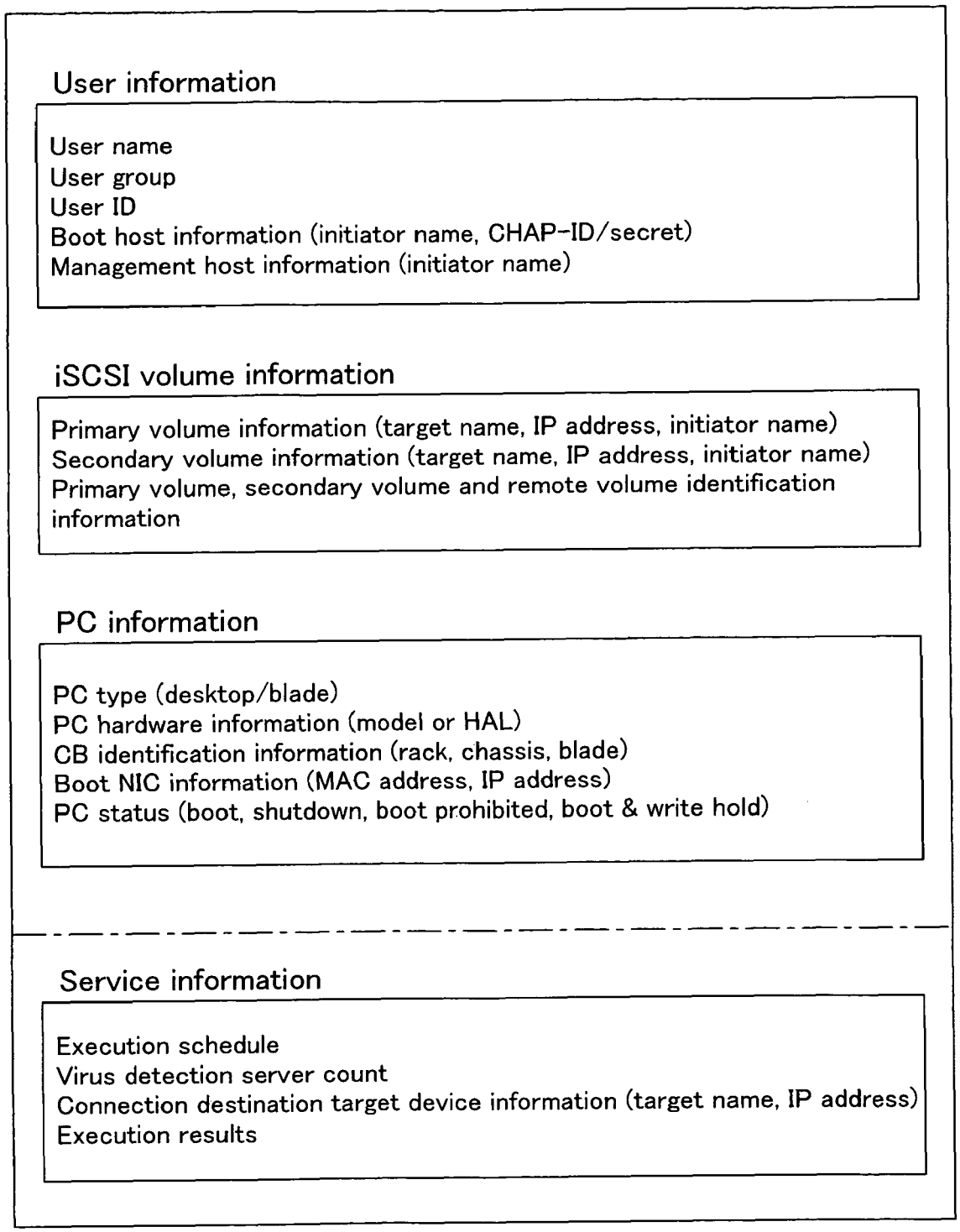
FIG. 7 is an explanatory drawing showing an example of the management information and the service information stored in the storage device of the system management server.

The management information and the service information stored in the storage device 11 of the system management server 10 is described while referring to FIG. 7. FIG. 7 is an explanatory drawing showing an example of the management information and the service information stored in the storage device of the system management server.

The management information includes user information, iSCSI volume information, and PC information.

(1) In the user information is registered information relating to the user that uses the storage centric system in accordance with this embodiment. The user information includes a user name, a user group as user position information, a user ID, an iSCSI initiator name as boot host information used when the user does booting, and an iSCSI initiator name used when the system administrator does a backup or virus scan of the logical unit (iSCSI disk) correlated to the user as the management host information. As the user ID, an ID for logging in to a directory service compliant with LDAP (Lightweight Directory Access Protocol), specifically, an LDAP-ID, is used. Also, when the user is a user who uses the blade PC 42, there is further included a user ID/secret used for CHAP authentication in the boot host information.

(2) Registered in the iSCSI volume information is iSCSI volume information (boot volume (primary volume) and backup volume (secondary volume)) of the storage system that can be used by the user. Included in the iSCSI volume information as the primary volume information necessary for iSCSI login to the primary volume are the target name, IP address, and initiator name, and as secondary volume information necessary for iSCSI login to the secondary volume are the target name, IP address, and initiator name. This iSCSI information is allocated to each centric PC 40 and 42 according to the user (user ID) of each centric PC 40 and 42. Included in the iSCSI volume information are information for identifying the primary volume and secondary volume, and remote volume identification information for identifying whether the volume is inside the storage system 20 or outside the storage system 20.

(3) Registered in the PC information is centric PC 40 and 42 information. The PC information includes the PC type that is information for identifying whether or not the centric PC is the desktop type centric PC 40 or is the blade type centric PC 42, PC hardware information indicating the model type or HAL (properties in terms of the PC hardware configuration), CB identification information indicating whether the blade type centric PC 42 is a rack type, a chassis type, or a blade type, boot NIC information indicating the MAC address and the IP address of the PC used during network booting, and information indicating whether the PC is in a booted state, a shutdown state, a boot prohibited state, or a boot and write hold state.

The information included in the PC status is described in detail.

(1) Boot

This indicates that the operating system is in a booted state for the centric PCs 40 and 42. Specifically, it indicates the state of the centric PCs 40 and 42 having the boot disk (primary volume) mounted. As a result, the virus detection and removal server 30 is not able to use a boot disk (primary volume) mounted by the centric PCs 40 and 42. Note that use means the virus detection and removal server 30 mounting the boot disk (primary volume) or performing synchronization processing of the volume pair.

(2) Shutdown

This shows that the operating system is shut down for the centric PCs 40 and 42. Specifically, it shows that the centric PCs 40 and 42 are in a state with the boot disk (primary volume) not mounted (unmounted). In this case, both the centric PCs 40 and 42 and the virus detection and removal server 30 are able to mount the boot disk (primary volume), and the virus detection and removal server 30 is able to execute synchronization processing of the volume pair that contains the boot disk that is the subject.

(3) Boot Prohibited

This indicates a state with the operating system shut down for the centric PCs 40 and 42, and the virus detection and removal server 30 using the boot disk (primary volume). In this case, the centric PCs 40 and 42 are not able to mount the boot disk (primary volume), so it is not possible to boot the operating system.

(4) During Boot and Write Hold

This shows a state with the operating system booted for the centric PCs 40 and 42 (the centric PCs 40 and 42 are in a state with the boot disk (primary volume) mounted, though), and a state with the write process to the boot disk (primary volume) on hold. In this case, the virus detection and removal server 30 is able to execute data synchronization of the boot disk (primary volume) and the backup disk (secondary volume).

Included in the service information is the virus detection processing execution schedule, the number of virus detection and removal servers 30, the IP address and target name as connection destination target device information for connecting to the primary volume or secondary volume that are subject to execution of the virus detection and removal process, and the execution results which is information indicating the virus detection process execution results and the virus removal process execution results.

Figure 8:
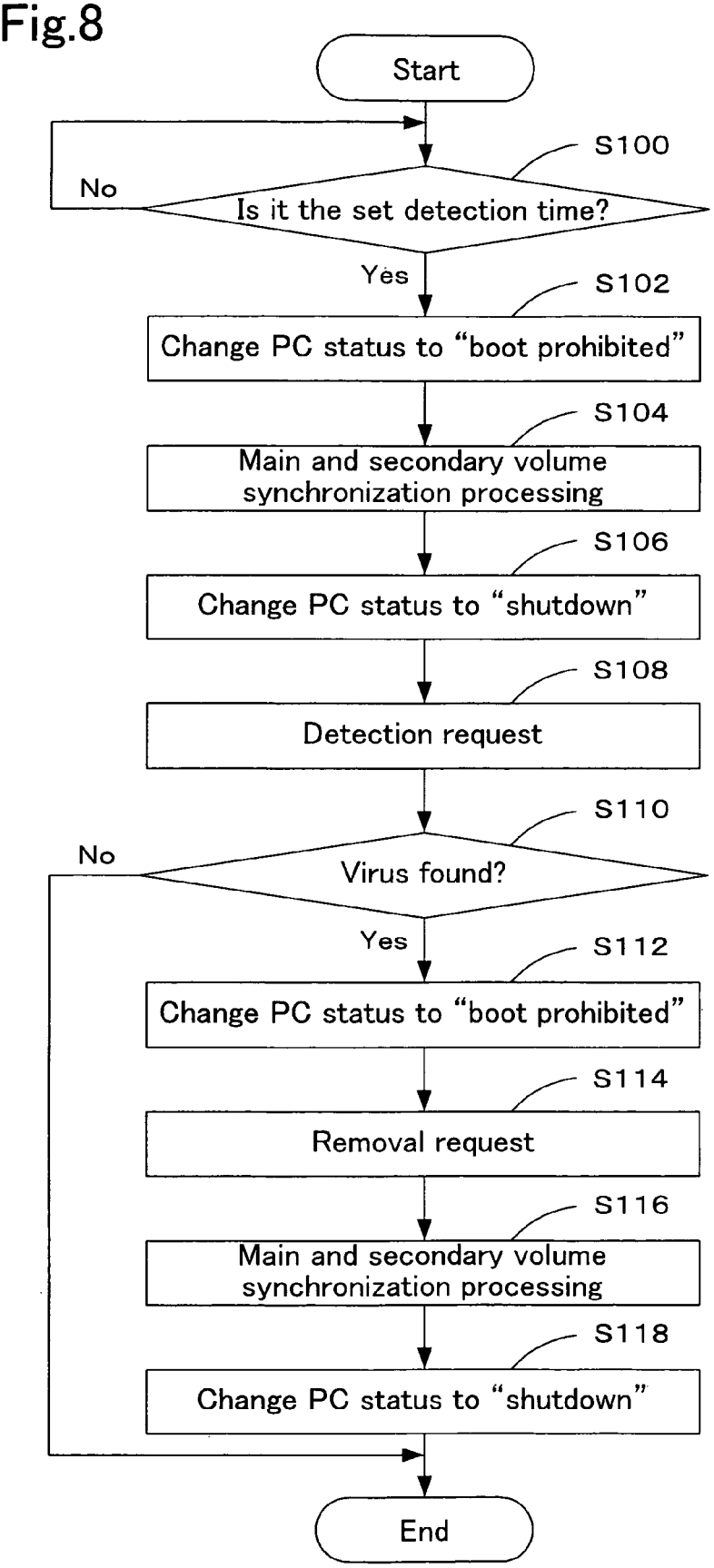
FIG. 8 is flow chart showing the processing routine executed by the system management server during virus detection processing.

A summary of the process executed by the system management server 10 during virus detection processing is described while referring to FIG. 8. FIG. 8 is flow chart showing the processing routine executed by the system management server during virus detection processing.

The system management server 10 (CPU 100) waits until the current time matches the periodic detection time of the virus detection (step S100: No), and when the current time matches the period detection time (step S100: Yes), selects the time for which the PC status is "shutdown" of the centric PCs 40 and 42 for which the subject secondary volume and the primary volume that forms the volume pair is used as the boot disk, and changes this to "boot prohibited" (step S102). The virus detection periodic detection time is registered as execution schedule information of the service information, and, for example, a plurality of times during one day such as 0 o'clock, 6 o'clock, 12 o'clock, and 18 o'clock can be stipulated as the virus detection's detection time, or for example, only once per day, such as 12 o'clock, can be stipulated as the virus detection's detection time. Furthermore, it is also possible to stipulate a specific time of a specific day of the week as the virus detection time.

The system management server 10 makes a request to the storage system 20 for data synchronization processing of the primary volume and the secondary volume for the volume pair including the secondary volume subject to virus detection processing (step S104). The system management server 10 receives notification of completion of the data synchronization as well as notification of completion of separation of the primary volume and secondary volume from the storage system 20, and changes the PC status of the subject centric PCs 40 and 42 to "shutdown" (step S106). The system management server 10 makes a request to the virus detection and removal server 30 for virus detection processing on the secondary volume that is the subject (step S108). The virus detection processing by the virus detection and removal server 30 is executed by detecting whether or not a file that matches the virus pattern defined in the virus pattern file exists in the secondary volume.

The virus detection and removal server 30 receives a request from the system management server 10 and executes virus detection processing on the secondary volume, but the PC status is changed to "shutdown," so the subject centric PCs 40 and 42 mount the primary volume and are able to boot the operating system. With this embodiment, the virus detection processing by the virus detection and removal server 30 is executed on the secondary volume, so it becomes a back end process, and the centric PCs 40 and 42 execute application programs, and are able to execute data write processing on the primary volume. Specifically, it is possible to execute the virus detection processing on the storage system 20 without blocking work using the centric PCs 40 and 42 at the front end.

The system management server 10 ends this processing routine when a detection result to the effect that a virus file was not found is received from the virus detection and removal server 30 (step S110: No). While virus detection processing is being executed on the secondary volume by the virus detection and removal server 30, the changes added to the secondary volume that makes the volume pair are reflected in the secondary volume at the timing of the next data synchronization.

When the system management server 10 receives from the virus detection removal server 30 detection results to the effect that a virus file was found (step S110: Yes), a request is made to the centric PCs 40 and 42 to shut down the operating system, and when shutdown completion notification of the operating system is received from the centric PCs 40 and 42, the PC status of the subject centric PCs 40 and 42 is changed to "boot prohibited" (step S112).

The system management server 10 makes a request to the virus detection removal server 30 to destroy the virus infected file (step S114). The virus detection and removal server 30 executes virus removal processing on the secondary volume for which the virus infected file was detected and on the primary volume that forms the volume pair.

When the system management server 10 receives notification from the virus detection and removal server 30 of removal completion, it makes a request to the storage system 20 for data synchronization of the primary volume and the secondary volume (step S116). With this data synchronization process, the contents of the primary volume for which the virus infected file was removed are reflected in the secondary volume, and the virus infected file is also removed from the secondary volume.

When the system management server 10 receives from the storage system 20 notification that the data synchronization of the primary volume and secondary volume is completed and that separation of both volumes is completed, the PC status of the subject centric PCs 40 and 42 is changed to "shutdown" and this processing routine ends. Thereafter, the subject centric PCs 40 and 42 can use network booting to mount the primary volume, boot the operating system or application programs, and execute normal arithmetic processing.

Figure 9:
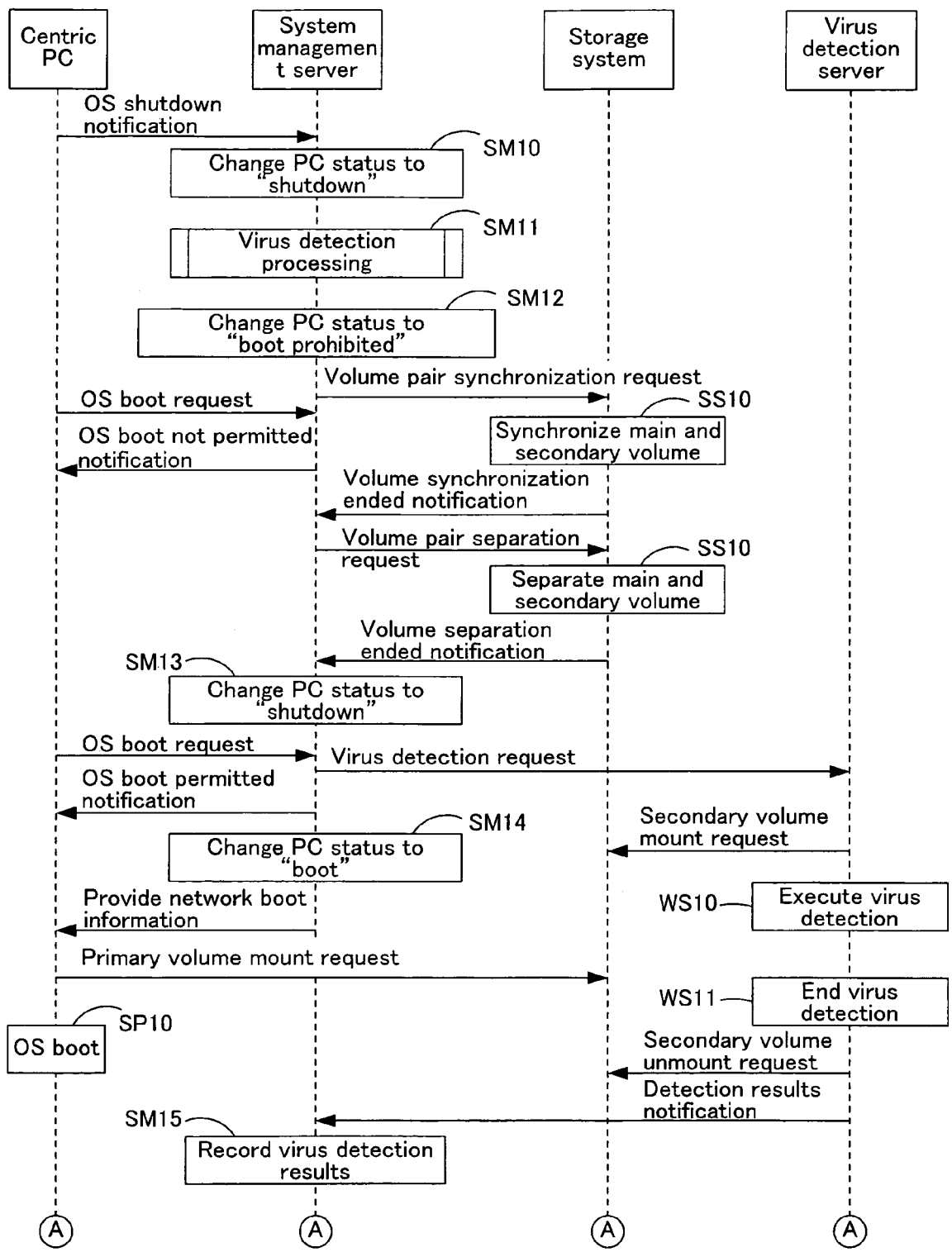
FIG. 9 is a flow chart showing the processing routines executed by the centric PCs, the system management server, the storage system, and the virus detection and removal server during virus periodic detection.
Figure 10:
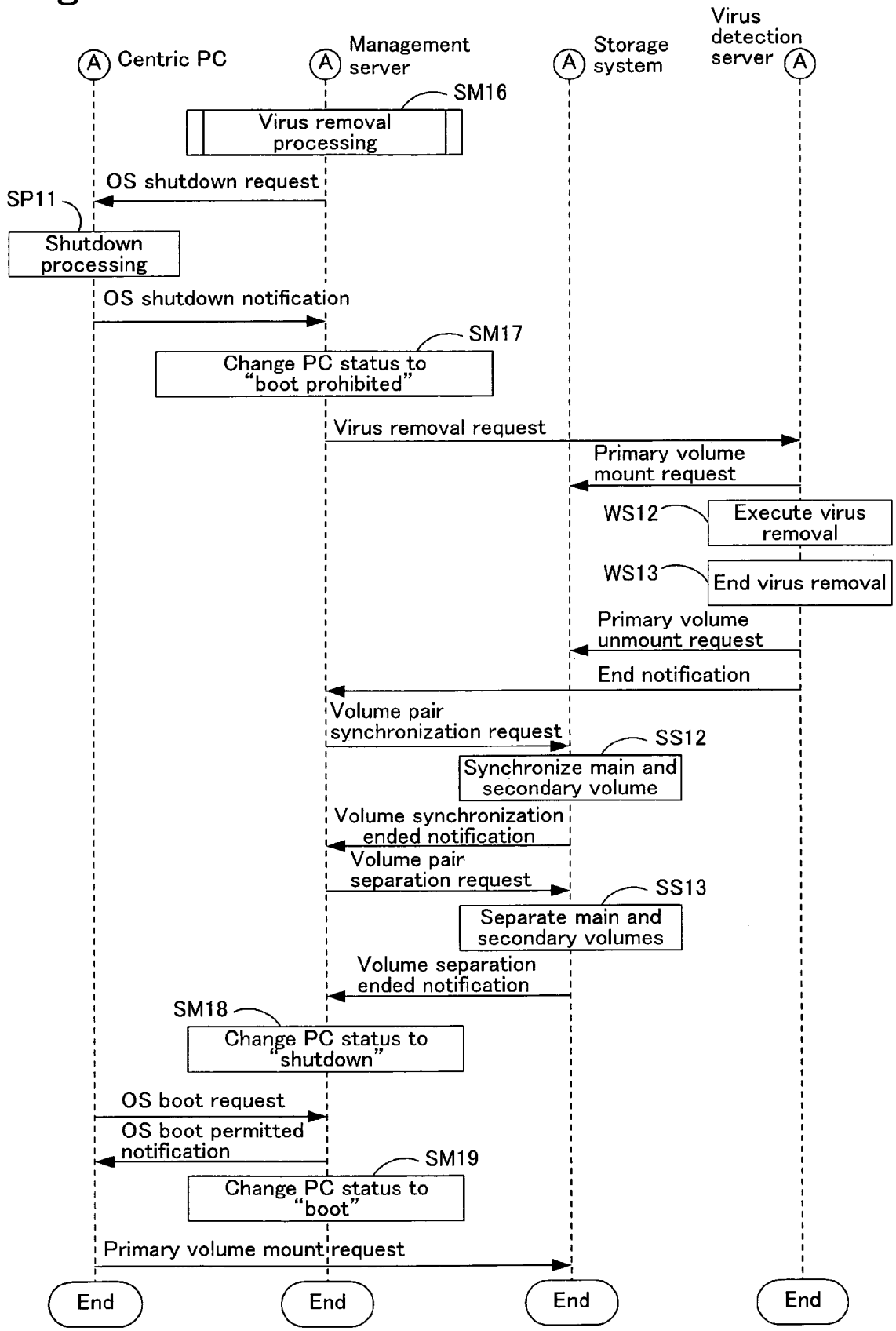
FIG. 10 is a flow chart showing the processing routines executed by the centric PCs, the system management server, the storage system, and the virus detection and removal server during virus periodic detection.

The detailed processes executed by the centric PCs 40 and 42, the system management server 10, the storage system 20, and the virus detection and removal server 30 during virus period detection are described in detail while referring to FIG. 9 and FIG. 10. FIG. 9 and FIG. 10 are flow charts showing the processing routines executed by the centric PCs, the system management server, the storage system, and the virus detection and removal server during virus periodic detection.

When the operating system (OS) is shutdown, the centric PCs 40 and 42 give notification of OS shutdown to the system management server 10. When the system notification server 10 receives notification of OS shutdown, the PC status of the centric PCs 40 and 42 notified of OS shutdown (subject centric PCs) changes to "shutdown" (SM10). When the PC status "shutdown" is indicated, when the periodic virus detection time is suppressed, the system management server 10 starts the virus detection processing (SM11). Meanwhile, when the OS is booting for the subject centric PC during the periodic virus detection time, the system management server 10 starts virus detection processing after the OS of the subject centric PC is shut down. This is so as not to obstruct the processing work using the centric PCs 40 and 42 at the front end.

When virus detection processing starts, the system management server 10 changes the PC status of the subject centric PC to "boot prohibited" (SM12), and makes a request to the storage system 20 to synchronize the volume pair including the primary volume allocated to the subject centric PC (data synchronization). Note that as described previously, the volume pair synchronization and volume pair separation requests actually sent to the storage system 20 are general purpose write or read commands to a specific primary volume made to the command device, and these are converted by the command device to synchronization commands of the specific primary volume and the secondary volume that makes the volume pair of the specific primary volume.

After the PC status is changed to "boot prohibited," even when an OS boot request, specifically, a network boot request, is sent from the subject centric PC to the system management server, the system management server 10 sends an OS boot not-permitted notification to the subject centric PC, and OS booting is not allowed.

The storage system 20 that has received a synchronization command executes data synchronization of the primary volume and the secondary volume (SS10), and when data synchronization is complete, a volume pair synchronization ended notification is sent to the system management server 10. The system management server 10 that has received a volume pair synchronization ended notification makes a request to the storage system 20 to separate volume pairs for which data synchronization has ended.

The storage system 20 that has received a separation (asynchronization) command executes separation of the primary volume and the secondary volume (SS11), and when separation of the volume pair is completed, sends a volume pair separation ended notification to the system management server 10. The system management server 10 that has received a volume pair separation ended notification changes the PC status of the subject centric PC to "shutdown" (SM13), and makes a request to the virus detection and removal server 30 for virus detection processing on the secondary volume.

When the PC status is "shutdown," the subject centric PCs 40 and 42 are able to boot the OS and execute processes requested by the user. Specifically, with the storage centric system in accordance with this embodiment, it is possible to execute virus detection processing on the storage system 20 without making the user of the centric PCs 40 and 42 aware of execution of the virus detection process. In more specific terms, with the storage centric system in accordance with this embodiment, virus detection processing is executed on the primary volume allocated to the subject centric PCs 40 and 42 and on the secondary volume that makes the volume pair, so even during execution of virus detection processing on the storage system 20, it is possible to boot the OS of the subject centric PCs 40 and 42 and to execute processing requested by the user.

When the system management server 10 receives an OS boot request from the subject centric PCs 40 and 42, it gives notification of OS boot permission to the subject centric PCs 40 and 42, and changes the PC status of the subject centric PCs 40 and 42 to "boot" (SM14). The system management server 10 sends to the subject centric PCs 40 and 42 the information necessary for network booting, specifically, the information necessary to mount the primary volume. The subject centric PCs 40 and 42 use the received network boot information and execute the previously described network boot processing, mount the allocated primary volume, and boot the operating system (SP10).

The virus detection and removal server 30 that has received a virus detection processing request mounts the subject secondary volume and executes virus detection processing (WS10). As described already, the virus detection process is executed by detecting a virus infected file that matches the virus pattern described in the virus pattern file. When the virus detection process ends (WS1), the virus detection and removal server 30 unmounts the secondary volume and gives notification of the detection results to the system management server 10.

The system management server 10 that has received notification of the detection results records the virus detection results in the service information (SM15).

A continuation of this is described while referring to FIG. 10. When the system management server 10 finds a virus infected file in the secondary volume as a result of virus detection processing, it executes virus removal processing (SM16). The system management server 10 sends an OS shutdown request to the subject centric PCs 40 and 42. The subject centric PCs 40 and 42 that has received the OS shutdown request executes shutdown processing of the operating system (SP11) and sends OS shutdown notification to the system management server 10.

When the OS shutdown notification is received, the system management server 10 changes the PC status to "boot prohibited," and makes a request for virus removal to the virus detection and removal server 30. While the PC status is "boot prohibited," as described previously, the subject centric PCs 40 and 42 cannot boot the operating system.

The virus detection and removal server 30 that has received the virus removal request mounts the secondary volume for which the virus was found and the primary volume that makes the volume pair, and executes virus removal processing on the primary volume (WS12). When the virus removal process ends (WS13), the virus detection and removal server 30 unmounts the primary volume, and gives notification that the virus removal has ended to the system management server 10.

When the virus removal ended notification is received, the system management server 10 makes a request to the storage system 20 for synchronization of the volume pair (data synchronization) including the primary volume allocated to the subject centric PC. The storage system 20 that has received the synchronization command executes data synchronization on the primary volume and secondary volume (SS12), and when the data synchronization is completed, sends a volume pair synchronization ended notification to the system management server 10. The system management server 10 that received the volume pair synchronization ended notification makes a request to the storage system 20 for separation of the volume pair for which data synchronization has ended.

The storage system 20 that has received the separation (asynchronization) command executes separation on the primary volume and secondary volume (SS13), and when the volume pair separation is completed, sends a volume pair separation ended notification to the system management server 10. The system management server 10 that has received the volume pair separation ended notification changes the PC status of the subject centric PC to "shutdown" (SM18).

After the PC status is "shutdown," when an OS boot request is received from the subject centric PCs 40 and 42, the system management server 10 gives OS boot permission notification to the subject centric PCs 40 and 42, and changes the PC status of the subject centric PCs 40 and 42 to "boot" (SM19). The subject centric PCs 40 and 42 execute the previously described network boot processing, mount the allocated primary volume, and boot the operating system.

When the above processing ends, the centric PCs 40 and 42, the system management server 10, the storage system 20, and the virus detection and removal server 30 end the virus detection and removal processing. Note that the aforementioned virus detection processes are executed in sequence on all the secondary volumes that the storage system 20 has according to the virus detection execution schedule.

Also, with the aforementioned example, the virus removal process is executed on the primary volume that makes the volume pair including the secondary volume for which virus detection processing was executed, but it is also possible to execute it on the secondary volume for which virus detection processing was executed. In this case, after the virus removal process on the secondary volume ends, by executing reverse data synchronization that does data synchronization of the primary volume contents to the secondary volume contents, the virus infected file is removed from the primary volume.

Figure 11:
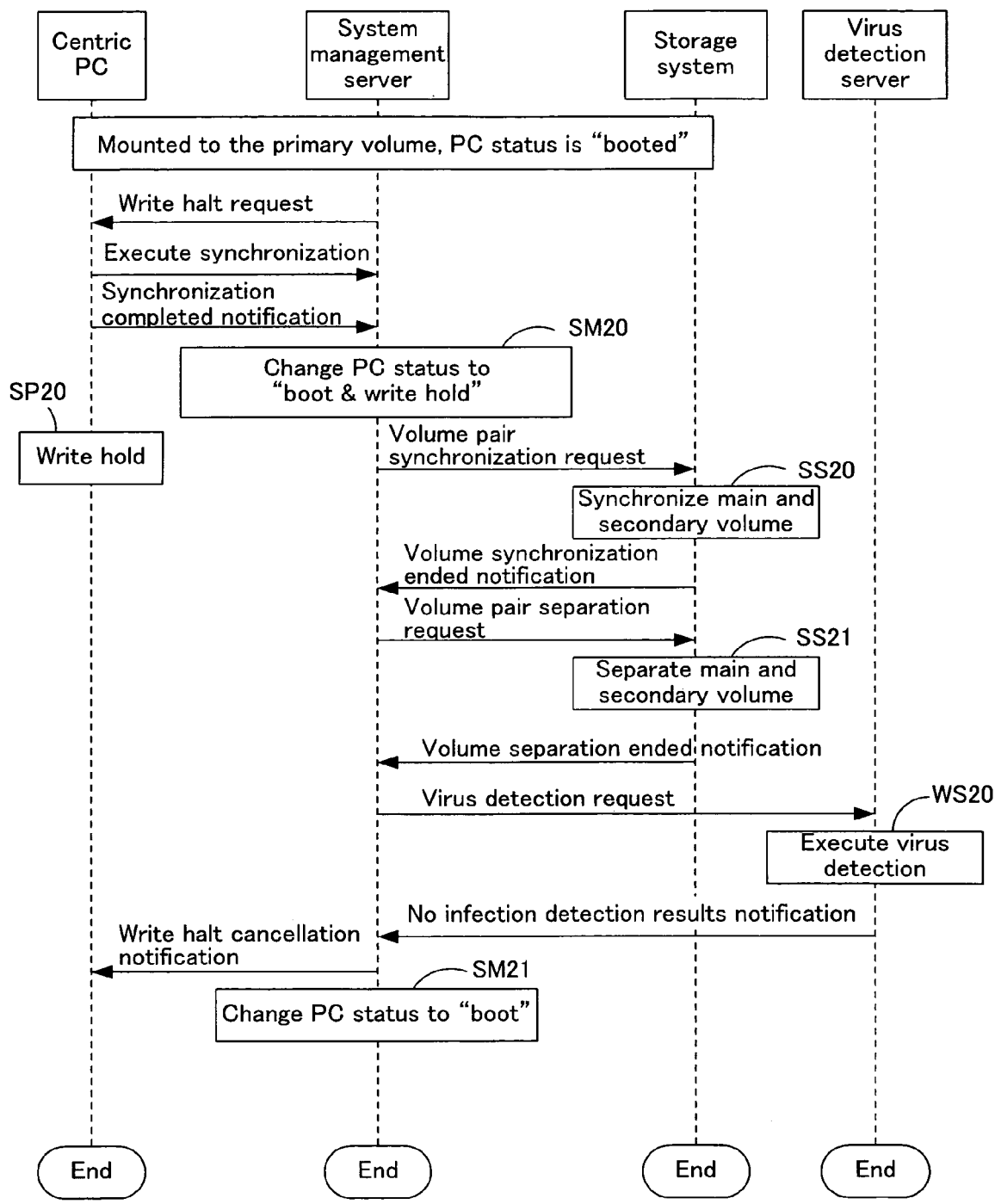
FIG. 11 is a flow chart showing the processing routine of irregular virus detection processing when a virus infected file is not found.
Figure 12:
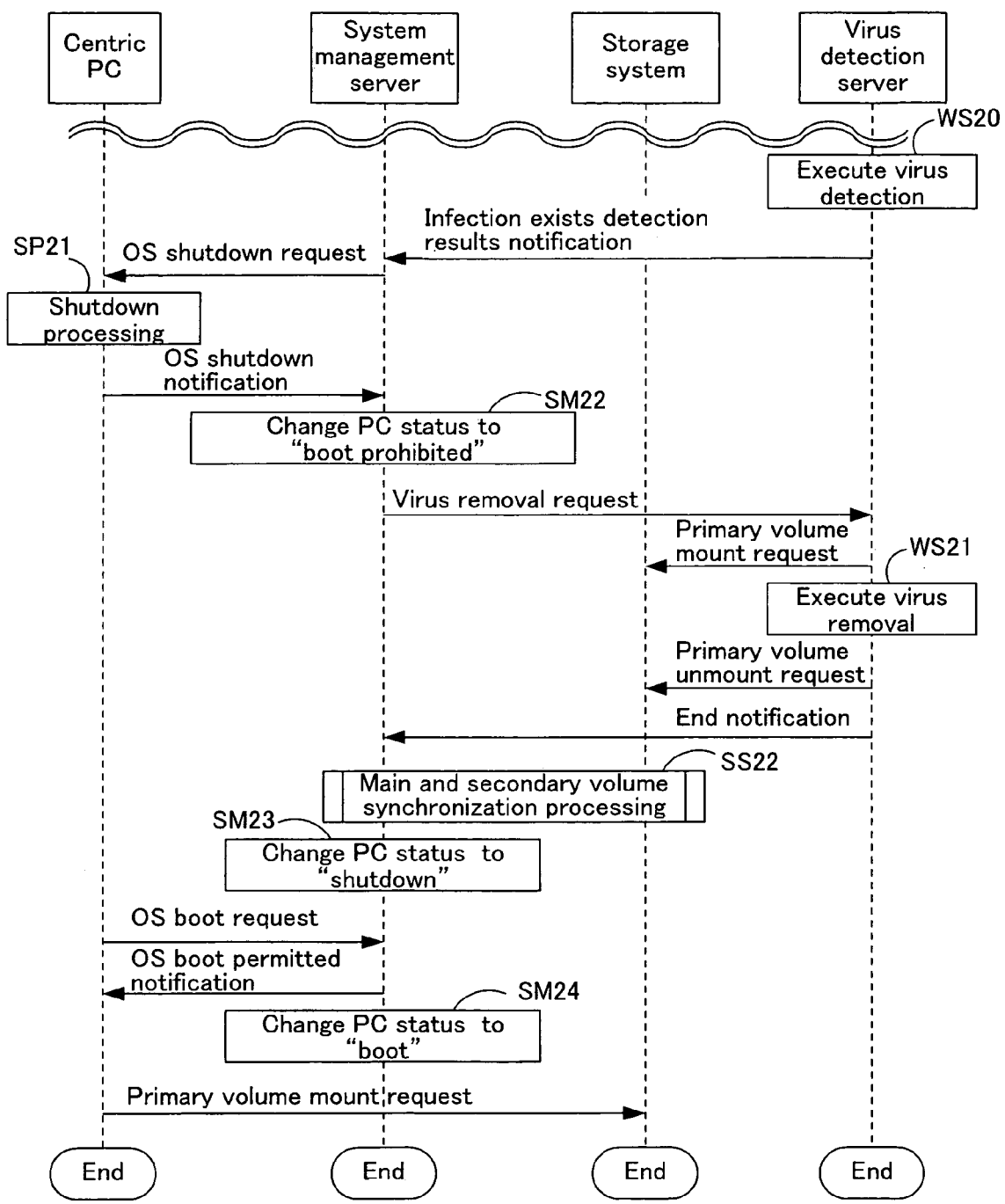
FIG. 12 is a flow chart showing the processing routine of irregular virus detection processing when a virus infected file is found.
Figure 13:
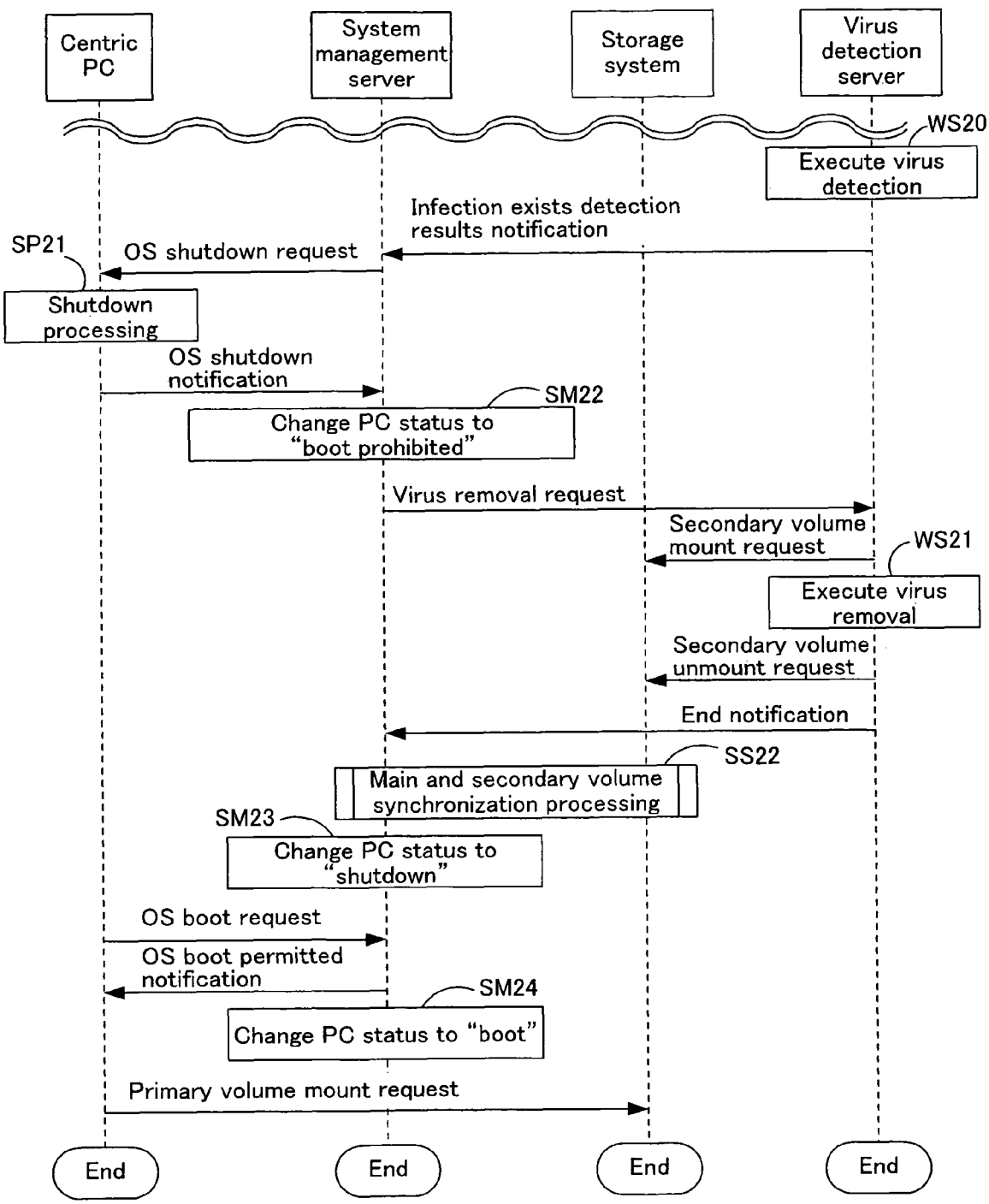
FIG. 13 is a flow chart showing another processing routine of irregular virus detection processing when a virus infected file is found.

Irregular Virus Detection Processing:

Irregular virus detection processing is described while referring to FIG. 11 through FIG. 13. Irregular virus detection processing is emergency virus detection processing executed when notice is received from a virus countermeasure software company, or when notice is received of virus infection in another storage system, for example, and is executed at a different timing from the periodic virus detection processing. FIG. 11 is a flow chart showing the processing routine of irregular virus detection processing when a virus infected file is not found. FIG. 12 is a flow chart showing the processing routine of irregular virus detection processing when a virus infected file is found. FIG. 13 is a flow chart showing another processing routine of irregular virus detection processing when a virus infected file is found.

Irregular virus detection processing (hereafter called "emergency virus detection processing") is executed in sequence on the secondary volume that the storage system 20 has. First, described is an example when the centric PCs 40 and 42 have the secondary volume subject to virus detection processing and the primary volume that makes the volume pair (subject primary volume) mounted, and the operating system is booted (PC status is "booted").

When an emergency virus detection request is received, the system management server 10 makes a request to the subject primary volume mounted centric PCs 40 and 42 (subject centric PCs 40 and 42) to hold writing to the storage system 20 (primary volume). Issuing of the emergency virus detection request can be done, for example, by the virus countermeasure software company server, or the administrator of this storage centric system for which it is known that a virus infection has spread. During write hold, the centric PCs 40 and 42 are able to read data from the allocated primary volume, but not able to write data to the allocated primary volume.

The subject centric PCs 40 and 42 that have received a write hold request execute write data synchronization processing of the write data remaining in cache to the primary volume, and when data synchronization processing is completed, sends a synchronization completion notice to the system management server 10.

The system management server 10 that has received a synchronization completion notice from the subject centric PCs 40 and 42 changes the PC status of the subject centric PCs 40 and 42 to "boot & write hold."

After write hold is requested, the subject centric PCs 40 and 42 execute write hold processing (SP20). With the write hold processing, the subject centric PCs 40 and 42 (write control module) store in time sequence in cache the data for which write was requested to the primary volume by an application program, and execution of writing to the primary volume is held. Specifically, seen from the application program, the data for which write was requested is written properly to the primary volume.

Note that when the capacity of the write request data to be stored exceeds the cache capacity, it is possible to destroy all the data stored in cache, or to keep the data up until the cache capacity is exceeded, and after the capacity is exceeded, not to store any new data. In the former case, the write control module CMM4 gives notification that write data that occurred after a specified time (for example, after data synchronization completion notification) cannot be written to the primary volume and that a write error occurred. In the latter case, the write control module CMM4 gives notification that a write error occurred for the data that could not be written to cache. The notification to the user is expressed by displaying an error message to the effect that writing failed of the write data (could not be written to the primary volume) on the screen of the display device. Or, it is also possible to keep the data until the cache capacity is exceeded, and after the capacity is exceeded, to stop the processing of application programs that generate write data.

When the PC status of the subject centric PCs 40 and 42 changes to "boot & write hold," the system management server 10 makes a request to the storage system 20 to synchronize the volume pair (data synchronization) of the volume pair that includes the primary volume allocated to the subject centric PCs 40 and 42. The storage system 20 that has received a synchronization command executes data synchronization of the primary volume and secondary volume (SS20), and when data synchronization is completed, sends volume pair synchronization ended notification to the system management server 10. The system management server 10 that has received the volume pair synchronization ended notification makes a request to the storage system 20 for separation of the volume pair for which data synchronization has ended.

The storage system 20 that has received a separation (asynchronization) command executes separation of the primary volume and the secondary volume (SS21), and when the volume pair separation is completed, sends a volume pair separation ended notification to the system management server 10. The system management server 10 that has received the volume pair separation ended notification makes a request to the virus detection and removal server 30 for virus detection processing on the secondary volume.

The virus detection and removal server 30 that has received the virus detection processing request mounts the secondary volume that is the subject, and executes the previously described virus detection process (WS20). The process flow in FIG. 11 is the process flow when a virus infected file is not found, so the virus detection and removal server 30 gives notification to the system management server 10 of the detection results to the effect that a virus infected file was not found.

The system management server 10 that has received notification that there is no virus infection sends a write hold cancellation notification to the subject centric PCs 40 and 42, and changes the PC state of the subject centric PCs 40 and 42 to "boot" (SM21). Thereafter, the subject centric PCs 40 and 42 are able to execute writing of data to the primary volume. The subject centric PCs 40 and 42 execute writing to the primary volume in sequence from the data stored in cache during write hold processing.

When the centric PCs 40 and 42, the system management server 10, the storage system 20, and the virus detection and removal server 30 end the above processes, the emergency virus detection process ends.

Next, while referring to FIG. 12, described is a case of a virus infected file being found as a result of executing the emergency virus detection process. Note that until execution of virus detection by the virus detection and removal server 30, this is the same as when a virus infected file is not found, so that description is omitted.

The system management server 10 that has received notification that there is a virus infection sends an OS shutdown request to the subject centric PCs 40 and 42. The subject centric PCs 40 and 42 that have received an OS shutdown request execute shutdown processing of the operating system (SP21), and send an OS shutdown notification to the system management server 10. With the shutdown process, the data for which write was requested which is stored in cache is destroyed. Specifically, the operating system shuts down without executing writing of data to the primary volume requested by the application program.

When it receives an OS shutdown notification, the system management server 10 changes the PC status to "boot prohibited" (SM22), and makes a request to the virus detection and removal server 30 for virus removal. While the PC status is "boot prohibited," as described previously, the subject centric PCs 40 and 42 cannot boot the operating system.

The virus detection and removal server 30 that has received the virus removal request mounts the secondary volume for which the virus was found and the primary volume that makes the volume pair, and executes virus removal processing on the primary volume (WS21). When the virus removal process ends, the virus detection and removal server 30 unmounts the primary volume and gives notification to the system management server 10 that virus removal has ended.

When it receives the virus removal ended notification, the system management server 10, together with the storage system 20, using the procedure described previously, executes synchronization (data synchronization) of the volume pair containing the primary volume allocated to the subject centric PCs 40 and 42 (SS22). When the volume pair data synchronization is completed, the system management server 10 changes the PC status of the subject centric PCs to "shutdown" (SM23).

After the PC status is set to "shutdown," when an OS boot request is received from the subject centric PCs 40 and 42, the system management server 10 gives notification of OS boot permission to the subject centric PCs 40 and 42, and changes the PC status of the subject centric PCs 40 and 42 to "boot" (SM24). The subject centric PCs 40 and 42 execute network boot processing, mount the allocated primary volume, and boot the operating system.

When the centric PCs 40 and 42, the system management server 10, the storage system 20, and the virus detection and removal server 30 end the above processes, the virus detection and removal processing ends.

With the example shown in FIG. 12, virus removal processing is executed on the primary volume by the virus detection and removal server 30, but as shown in FIG. 13, the virus removal processing by the virus detection and removal server 30 can also be executed on the secondary volume. When the virus removal process is executed on the secondary volume, when it receives a virus removal request, the virus detection and removal server 30 mounts the secondary volume, executes the virus removal process (WS21), and unmounts the secondary volume after the virus removal process.

Note that during execution, when the execution subject secondary volume and primary volume that forms the volume pair are not mounted on either of the centric PCs 40 and 42, with the example described using FIG. 11 to FIG. 13, it is also possible not to execute processes relating to the write hold request on the subject centric PCs 40 and 42. Instead, with the PC status of the subject centric PCs 40 and 42 as "boot prohibited," the system management server 10 prohibits new writing to the primary volume that accompanies booting of the operating system.

Figure 14:
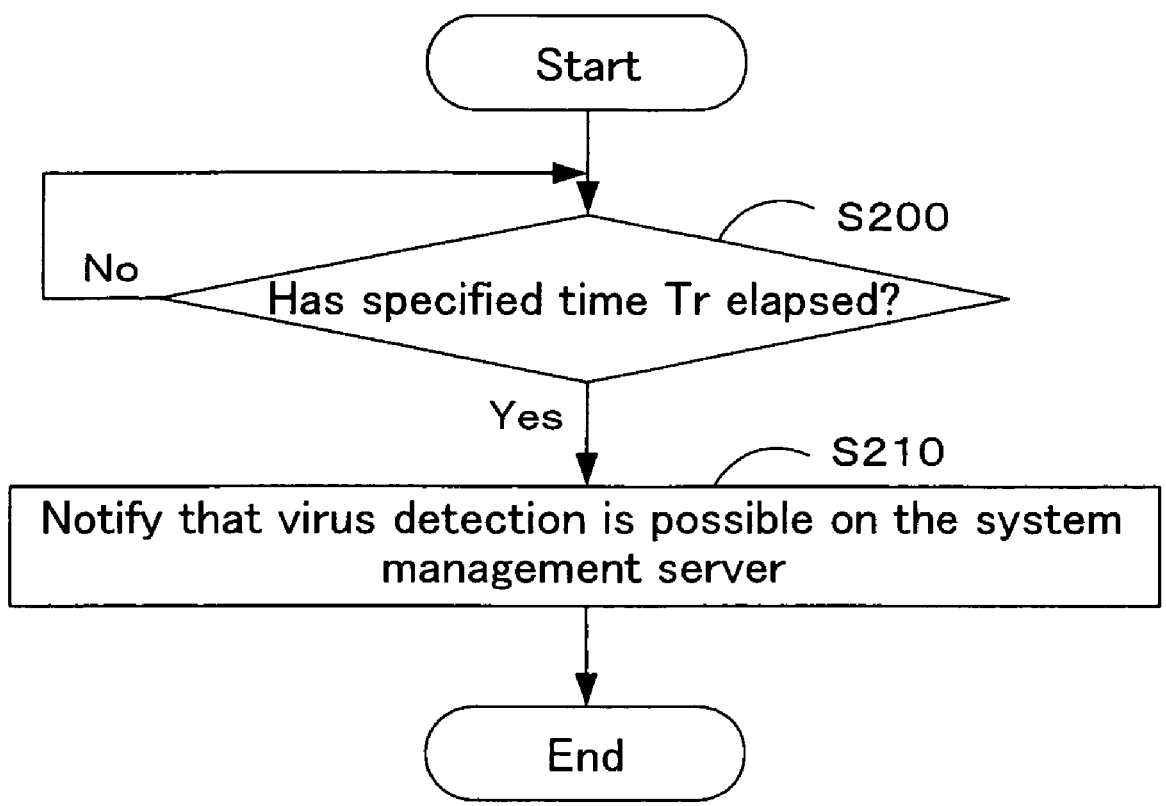
FIG. 14 is a flow chart that shows the processing routine that determines the virus detection timing.

An example of the process to determine the virus detection timing is described while referring to FIG. 14. FIG. 14 is a flow chart that shows the processing routine that determines the virus detection timing. With the example noted above, the virus detection processing was executed according to the virus detection schedule recorded in the service information, but when there is no access to the primary volume from the centric PCs 40 and 42, by executing the virus detection processing, it is possible to improve the virus detection process execution efficiency.

The storage system 20 (CPU 200) manages the access request interval to each primary volume, and when the access request interval is less than a specified time Tr (step S200: No), management continues. Meanwhile, when the access request interval is the specified time Tr or greater for any of the primary volumes (step S200: Yes), the storage system 20 gives notification to the system management server 10 that virus detection processing is possible on any primary volume (step S210), and this processing routine ends.

With the example in FIG. 14, during the time when there is no access (write request) from the centric PCs 40 and 42 to the primary volume, it is possible to execute virus detection processing, so it is possible to execute virus detection processing at a high frequency without forcing inconvenience on the user of the centric PCs 40 and 42. Therefore, it is possible to reduce or prevent the risk of virus infection for the storage system 20.

Figure 15:
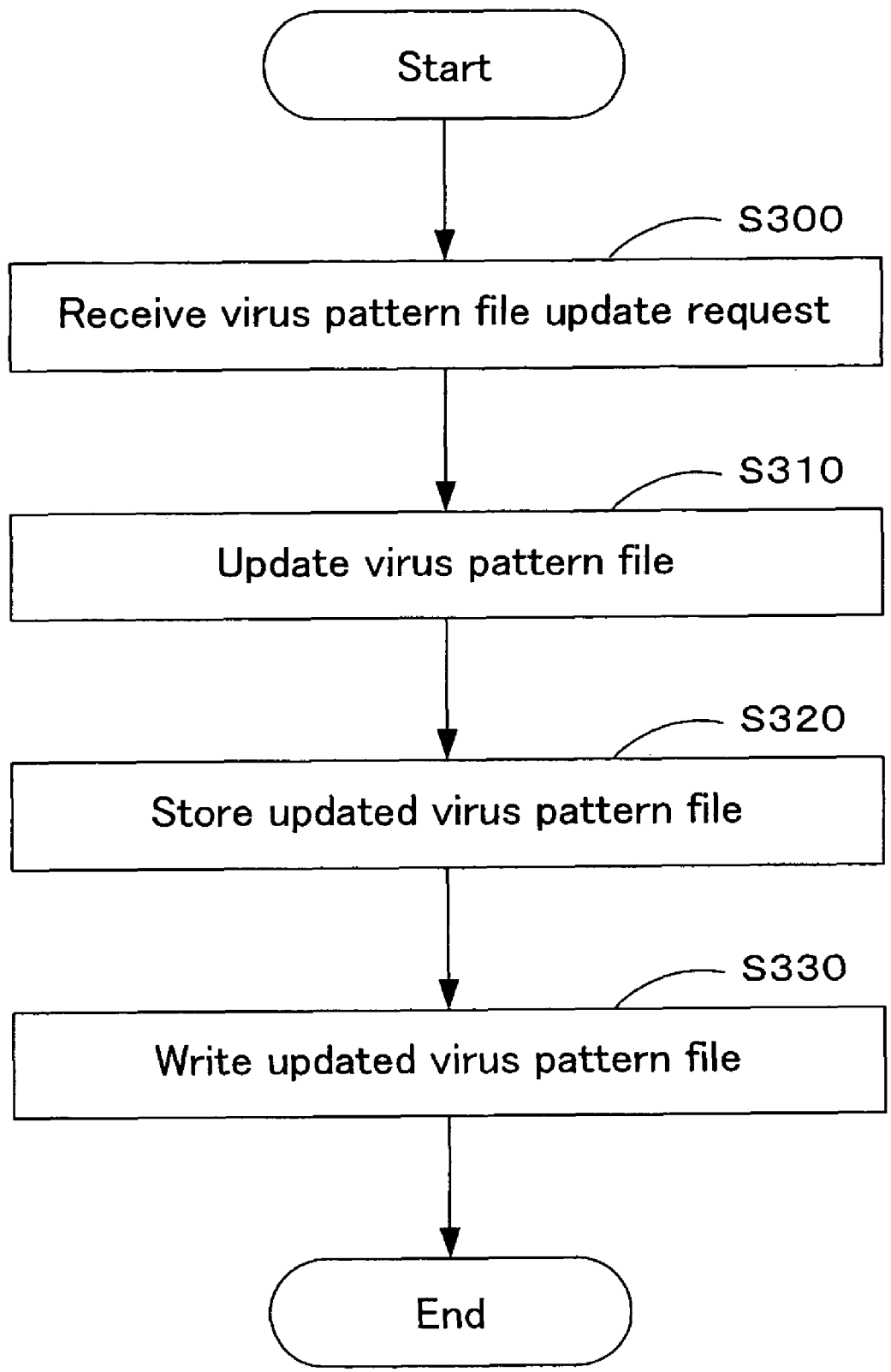
FIG. 15 is a flow chart showing the processing routine executed for the virus pattern file update process executed by the virus detection and removal server.

Virus Pattern File Update Processing:

The process of updating the virus pattern file is described while referring to FIG. 15. FIG. 15 is flow chart showing the processing routine executed for the virus pattern file update process executed by the virus detection and removal server 30.

The virus detection and removal server 30 receives a request from the system management server 10 (step S300), and updates the virus pattern file used for the virus detection processing executed by the virus detection and removal server 30 on the storage system 20, and the virus pattern file used for the virus detection processing executed in real time by the centric PCs 40 and 42 on the storage system 20 (step S302).

Here, the virus detection process executed by the virus detection and removal server 30 on the storage system 20 is each of the virus detection processes described above. Meanwhile, the real time virus detection processing executed by the centric PCs 40 and 42 is the virus detection processing executed in real time on the primary volume during execution of an application program by the CPU 400 of the centric PCs 40 and 42 for which the primary volume is mounted.

The virus detection and removal server 30 executes update processing of the virus pattern file by pulling an update virus pattern file from a virus pattern file distribution server installed on an external network.

The virus detection and removal server 30 stores the fetched update virus pattern file in the storage device 31 (step S304). The virus detection and removal server 30 mounts each primary volume at a specified timing, and writes to the primary volume the update virus pattern file used for real time virus detection processing at the centric PCs 40 and 42 (S306). For example, the update virus pattern file is stored in the reference folder of the virus detection program stored as a disk image in the primary volume.

Note that the virus detection and removal server 30 can also execute update processing of the virus pattern file by fetching a virus pattern file pushed to the virus detection and removal server 30 from the virus pattern file distribution server. In this case, it is not necessary to have virus pattern file update processing sent from the system management server 10.

Other Examples of the Storage System 20

Figures 16, 17:
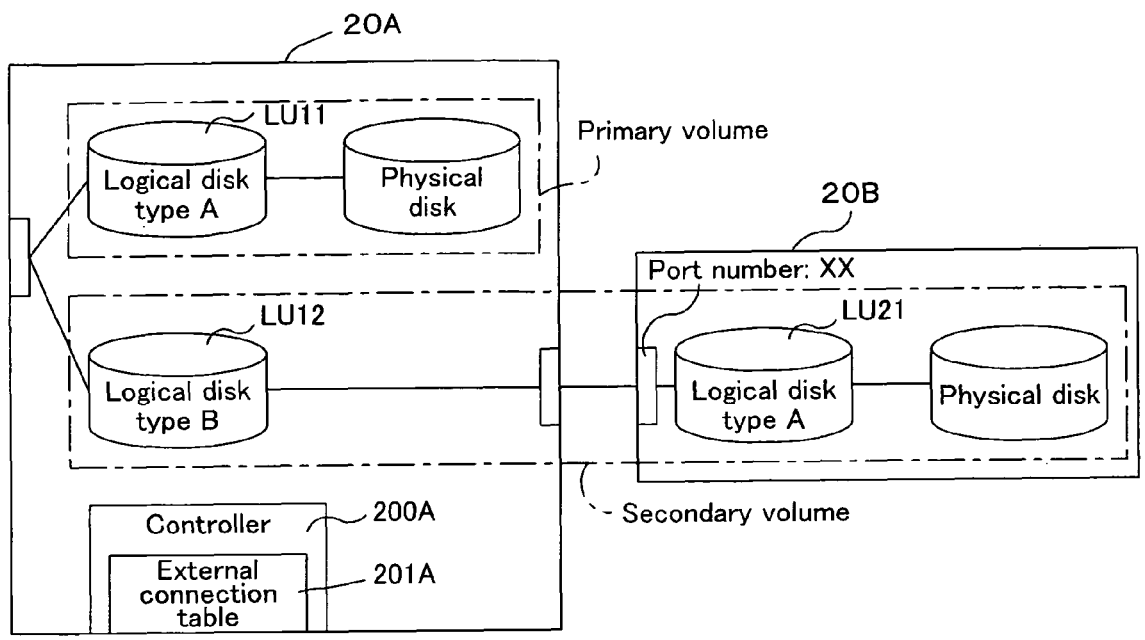
FIG. 16 is an explanatory drawing typically showing another structural example of a storage system that can be applied to the embodiment.
FIG. 17 is an explanatory drawing showing an example of a table used for connecting to an external storage system.

Another structural example of the storage system 20 is described while referring to FIG. 16 and FIG. 17. FIG. 16 is an explanatory drawing typically showing another structural example of a storage system that can be applied to this embodiment. FIG. 17 is an explanatory drawing showing an example of a table used for connecting to an external storage system.

With the example shown in FIG. 16, the storage system 20B has a logical disk LU21 mapped on a physical disk provided in the storage system 20B. The storage system 20A has a logical disk LU11 mapped in a physical disk provided in the storage system 20A and a logical disk LU12 mapped in the logical disk of the storage system 20B.

With the aforementioned embodiment, a primary volume and a secondary volume were provided within one storage system 20, but it is also possible to provide a primary volume within the storage system 20 and a secondary volume outside the storage system 20. For example, with the example in FIG. 16, it is possible to have the logical disk LU11 provided in the storage system 20A as the primary volume, and to have the logical disk LU21 provided in the storage system 20B as the secondary volume.

The controller 200A of the storage system 20A has a table 201A that stores the external storage system connection information shown in FIG. 17, and when access to the primary volume or the secondary volume is requested, the table 201A is referenced, and the data send and receive destination is determined. Access to the primary volume is executed mainly by the centric PCs 40 and 42, and access to the secondary volume is executed at the time of data synchronization from the virus detection and removal server 30 and the primary volume to the secondary volume.

Provided in the table 201A are logical disk identification information for clearly identifying a specified logical disk from among a plurality of logical disks provided in the storage system 20A, and type information indicating whether the logical disk is the type (type A) mapped on the physical disk of the storage system 20A, or the type (type B) mapped to the physical disk of the storage system 20B via the logical disk of the storage system 20B.

When the logical disk is type B, there is further stored connection port information as information for connecting to the physical disk of the external storage system 20B, and logical disk identification information for identifying the logical disk (mapped on the physical disk) to be connected to the storage system 20B.

In this way, even when the secondary volume is provided in an external (other) storage system 20B, it is possible to execute the virus detection processing and virus removal processing described for this embodiment.

As described above, according to the computer system with a storage centric system in accordance with this embodiment, virus detection processing by the virus detection and removal server 30 is executed on the secondary volume that forms the volume pair. Therefore, it is possible to execute virus detection on the storage system 20 without obstructing execution of write processing and read processing executed on the primary volume by the centric PCs 40 and 42. Specifically, even when the centric PCs 40 and 42 are doing virus detection processing, it is possible to continue write processing and read processing to the primary volume. Also, with this embodiment, it is possible to execute virus detection on the storage system 20 without depending on the user of the centric PCs 40 and 42, so it is possible to increase the execution efficiency of the virus detection processing, and possible to reduce or prevent virus detection leaks on the storage system 20. Furthermore, it is possible to reduce or remove the load relating to periodic virus detection processing on the centric PCs 40 and 42.

According to the computer system with a storage centric system in accordance with this embodiment, in addition to periodic virus detection processing, for irregular virus detection processing as well, virus detection processing is executed on the secondary volume that forms the volume pair, so it is possible to improve the virus detection processing execution efficiency without forcing inconvenience on the user of the centric PCs 40 and 42.

Also, with the irregular virus detection processing, data synchronization is done for the centric PCs 40 and 42 cache and the primary volume, and after data synchronization is further done for the primary volume and the secondary volume, virus detection is executed on the secondary volume. Therefore, it is possible to execute virus detection processing on the secondary volume in which is reflected the write data generated at the centric PCs 40 and 42. Furthermore, by the centric PCs 40 and 42 storing in cache the write data generated by application programs or the like during data write hold to the primary volume, writing to the primary volume is completed virtually, so there is no forcing of inconvenience on the user.

Furthermore, with the computer system with a storage centric system in accordance with this embodiment, the periodic and irregular virus detection processing for the virus detection and removal server 30 and the updating of the virus pattern file used for real time virus detection processing for the centric PCs 40 and 42 are executed by the virus detection and removal server 30, so it is possible to collectively manage updating of the virus pattern files.

With the computer system with a storage centric system in accordance with this embodiment, virus removal processing is executed on the primary volume or the secondary volume by the virus detection and removal server 30, so it is possible to execute virus removal processing on the storage system 20 without depending on the user of the centric PCs 40 and 42. Therefore, it is possible to execute suitable virus removal processing without depending on user knowledge and experience relating to virus removal.

With this embodiment, it is possible to have the virus removal processing executed on the storage system 20 by the virus detection and removal server 30, so it is possible to execute virus removal processing with the centric PCs 40 and 42 separated from the network. Therefore, it is possible to suppress or prevent a further expansion of virus infection via the network. The centric PCs 40 and 42 access the primary volume in which the virus detection program is stored via the network, boot the operating system, and execute virus removal processing. Therefore, to execute virus removal processing, it is not possible to block the centric PCs 40 and 42 from the network, and when the centric PCs 40 and 42 boot the operating system, the virus infected file is executed, and there is the risk that there will be further expansion of the virus infection.

Other Embodiments:

(1) With the aforementioned embodiment, copy data of the primary volume on the secondary volume is used as backup data, but as shown in FIG. 18, it is also possible to use a backup volume separate from the main and secondary volumes. In this case, by completion of the virus detection processing on the secondary volume and storing the secondary volume data in which there is no virus infected file in the backup volume, it is possible to use data for which there is no possibility of virus infection or for which the possibility of virus infection is low as the backup data. Note that it is also possible for the secondary volume backup, based on the circumstances, to be either the pull backup method that uses all the data of the secondary volume as the backup data, or the differential backup method that backs up the changed differential data. In either case, copy processing is executed between the secondary volume and the backup volume, so there is no effect on the operation of the centric PCs 40 and 42 at the front end.

(2) With the aforementioned embodiment, iSCSI protocol is used as the communication control protocol between each computer 10, 30, 40, and 42 and the storage system 20, but it is also possible to use another protocol, such as the fiber channel protocol, for example.

(3) With the aforementioned embodiment, one primary volume was allocated to each centric PC 40 and 42, but it is also possible to allocate two or more primary volumes. It is also possible to have one or a plurality of secondary volumes to form the volume pair with each primary volume.

(4) The subject range (scan range) of virus detection processing with the aforementioned embodiment can be all the range of the secondary volume or can be part. For example, it is also possible to execute for a range corresponding to date changed from the previous virus detection process.

Above, described were a computer system having a storage system as a core, a management PC, a storage system, and a virus detection processing method in accordance with the invention based on the embodiment, but the embodied aspects of the invention noted above are to make the invention easy to understand, and to not limit the invention. The invention can of course be modified or revised without straying from its key points or claims, and the invention includes equivalent items.

What is claimed is:

1. A computer system having storage, comprising:
   a client computer associated with an operating system, and having a plurality of operating statuses, the operating statuses comprising a boot status, a shutdown status, a prohibition of booting status, and a during boot and write-hold status;
   a storage system comprising a primary volume that stores data used for booting the client computer, and a secondary volume that stores copy data of the data used for booting the client computer;
   a management computer that makes a request to the storage system for synchronization of the primary volume and the secondary volume to copy the data used for booting the client computer to the secondary volume at a specified timing, and when copying of the data used for booting the client computer to the secondary volume ends, requests cancellation of the synchronization; and
   a virus detection computer that executes virus detection processing on the secondary volume for which synchronization was cancelled,
   wherein when a virus is detected in the secondary volume as a result of the virus detection process, the client computer shuts down the operating system according to a request from the management computer, an operating status of the client computer is changed to the boot prohibited status, and the virus detection computer executes a virus removal process on the primary volume according to a request from the management computer.

2. The computer system in accordance with claim 1, wherein the storage system internally contains a storage device having the primary volume and the secondary volume.

3. The computer system in accordance with claim 2,
wherein the storage device further comprises a backup volume to store backup data, and
wherein when a virus is not detected in the secondary volume as a result of the virus detection process, the management computer makes a request to the storage device to back up the data stored in the secondary volume to the backup volume.

4. The computer system in accordance with claim 2, wherein the storage device synchronizes the primary volume for which the virus removal has been executed and the secondary volume according to a request from the management computer sent after the virus removal is completed.

5. The computer system in accordance with claim 1, wherein the storage system further comprises:
a first storage device having the primary volume; and
a second storage device connected to the first storage device and having the secondary volume.

6. The computer system in accordance with claim 5,
wherein the storage system comprises a third storage device having a backup volume for storing backup data, and
wherein the management computer further makes a request to the second and third storage devices to back up the data stored in the secondary volume to the backup volume when no virus is detected in the secondary volume as a result of the virus detection process.

7. The computer system in accordance with claim 5, wherein when a virus is detected in the secondary volume as a result of the virus detection process, the client computer shuts down the operating system according to a request from the management computer, the virus detection computer executes virus removal processing on the secondary volume in the first storage device according to a request from the management computer, and the first storage device and the second storage device synchronize the primary volume of the first storage device for which the virus removal was executed and the secondary volume of the second storage device according to a request from the management computer sent after the virus removal is completed.

8. The computer system in accordance with claim 1, wherein the specified timing is the timing at which the client computer is shut down.

9. The computer system in accordance with claim 1, wherein the synchronization of the primary volume and the secondary volume is executed using complete synchronization.

10. The computer system in accordance with claim 1, wherein when the client computer is shut down, the management computer prohibits booting of the client computer and also makes a request to update the virus pattern file to the virus detection computer, and the virus detection computer executes updating of the virus pattern file stored in the primary volume according to a request from the management computer.

11. The computer system in accordance with claim 1, wherein the synchronization of the primary volume and the secondary volume is executed by differential synchronization.

* * * * *